US011840375B2

(12) United States Patent
Ivory

(10) Patent No.: US 11,840,375 B2
(45) Date of Patent: Dec. 12, 2023

(54) MODULAR PASTRY STORAGE CAROUSEL

(71) Applicant: Alicia N. Ivory, Suffolk, VA (US)

(72) Inventor: Alicia N. Ivory, Suffolk, VA (US)

( * ) Notice: Subject to any disclaimer, the term of this patent is extended or adjusted under 35 U.S.C. 154(b) by 0 days.

(21) Appl. No.: 17/982,471

(22) Filed: Nov. 7, 2022

(65) Prior Publication Data

US 2023/0143424 A1 May 11, 2023

Related U.S. Application Data

(60) Provisional application No. 63/276,575, filed on Nov. 6, 2021.

(51) Int. Cl.
*B65D 21/08* (2006.01)
*B65D 25/28* (2006.01)
*A47G 19/30* (2006.01)

(52) U.S. Cl.
CPC ........... *B65D 21/083* (2013.01); *A47G 19/30* (2013.01); *B65D 25/2826* (2013.01)

(58) Field of Classification Search
CPC .. B65D 21/083; B65D 25/2826; A47G 19/30; A47G 23/08; A47G 19/26; A45C 11/20; A47J 47/10

USPC ......................................................... 220/23.4
See application file for complete search history.

(56) References Cited

U.S. PATENT DOCUMENTS

| 1,978,695 | A | * | 10/1934 | Clark | .................... F25D 25/027 |
| | | | | | 211/77 |
| D464,533 | S | * | 10/2002 | McGuyer | ....................... D7/707 |
| 2005/0005631 | A1 | * | 1/2005 | DeMars | ................. A47G 23/08 |
| | | | | | 62/530 |

* cited by examiner

*Primary Examiner* — Andrew D Perreault
(74) *Attorney, Agent, or Firm* — Pierce McCoy, Pllc; Bryce D. Miracle, Esq.

(57) ABSTRACT

A modular pastry packaging carousel is disclosed which provides the ability to individually store wedge-shaped pastry slices in a respective wedge-shaped pastry module. In a version of the application, the modular pasty packaging carousel generally comprises a bottom plate, a top plate, a spacer positioned between the bottom plate and the top plate providing a radial gab therebetween; and a plurality of wedge-shaped pastry modules, each comprising a sector-shaped removable base. The sector-shaped removable base includes a means for engaging the pastry module with the base tray radial connection channels.

3 Claims, 32 Drawing Sheets

MODULAR PASTRY STORAGE CAROUSEL

CROSS-REFERENCE TO RELATED APPLICATION

This application is based upon and claims the priority filing date of the previously filed, co-pending U.S. patent application entitled "MODULAR PASTRY STORAGE CAROUSEL" filed Nov. 6, 2021, having App. No. 63/276, 575, the entire disclosure of which is hereby incorporated by reference.

BACKGROUND

The present invention relates to packaging for food products. More particularly, the present invention relates to holders for presliced pastry. In a further aspect, the instant invention concerns a modular carousel for packaging of a plurality of individually servable pasty segments.

Pastry items, such as pies and cakes, are commonly produced in a larger, cylindrical size which require slicing into smaller individual servings. By conventional practice, circular pastries are cut into sectors or wedge-shaped segments.

For convenience, especially in commercial food establishments, the entire pastry is usually presliced. The several slices, undisturbed and retained in the original unsliced configuration, are stored and displayed in a holder having a tray and cover. Such holders, usually fabricated of plastic or the like, are readily and commercially available. Typically, a serving is distributed by removing the cover, lifting a selected segment from the tray, and replacing the cover.

The foregoing procedure, however, has proven to be less than satisfactory. The shelf life of presliced pastry is considerably foreshortened. Flavor, texture, and appearance deteriorate as a result of the loss of moisture. Periodic dislodgment of the cover during the removal of a segment accelerates the deterioration. Further, an individual segment is not immediately servable. At a minimum, the slice is placed upon a serving dish. For a slice that is to be carried from the premises, such as at a convenience store or a carry-out restaurant, individual packaging is required. In addition to the exertion of time and effort, packaging may have further interfered with the pastry segment. Wrapping paper, for example, usually mashes into the icing upon cake segments.

It would be highly advantageous, therefore, to remedy the deficiencies inherent in the prior art. Accordingly, it is an object of the present invention to provide an improved means for slicing, storing, preserving and packaging pastry.

SUMMARY

In accordance with the invention, a modular pastry packaging carousel is provided which provides the ability to individually store wedge-shaped pastry slices in a respective wedge-shaped pastry module. In a version of the application, the modular pasty packaging carousel generally comprises a bottom plate, a top plate, a spacer positioned between the bottom plate and the top plate providing a radial gap therebetween; and a plurality of wedge-shaped pastry modules comprising a sector-shaped removable base. The sector-shaped removable base includes a means for engaging the pastry module with the base tray radial connection channels.

In a version, an attachable removable handle carrier comprises a radial plate having a fixed handle; a plurality of radial channels formed by raised housings; and a plurality of radial attachment switches coupled within the radial channels which move between a released position to an extended engaged position.

In yet another version of the application, a radial pastry slicer assembly may generally include a base tray radial spacer and a plurality of radially positioned individual angular slicers each comprising first and second radial walls. Wherein each of the first and second radial walls comprises a bottom cutting edge and a sector-shaped top. An upper platform is provided which supports the radially positioned individual angular slicers and provides a plurality of radially positioned guide channels adapted to receive and guide the angular slicers from a retracted position to an extruded position.

These and other features of the present invention will become readily apparent upon further review of the following specification and drawings.

BRIEF DESCRIPTION OF THE DRAWINGS

These and other features, aspects, and advantages of the present invention will become better understood with regard to the following description and accompanying figures where.

DETAILED DESCRIPTION

Referring now to the figures wherein the showings are for purposes of illustrating a preferred version of the invention only and not for purposes of limiting the same, the present invention is a modular pastry packaging carousel that provides the ability to individually store wedge-shaped pastry slices in a respective module.

The following detailed description is of the best currently contemplated modes of carrying out exemplary versions of the invention. The description is not to be taken in the limiting sense but is made merely to illustrate the general principles of the invention since the scope of the invention is best defined by the appended claims.

Various inventive features are described below that can each be used independently of one another or in combination with other features.

Figure 1:
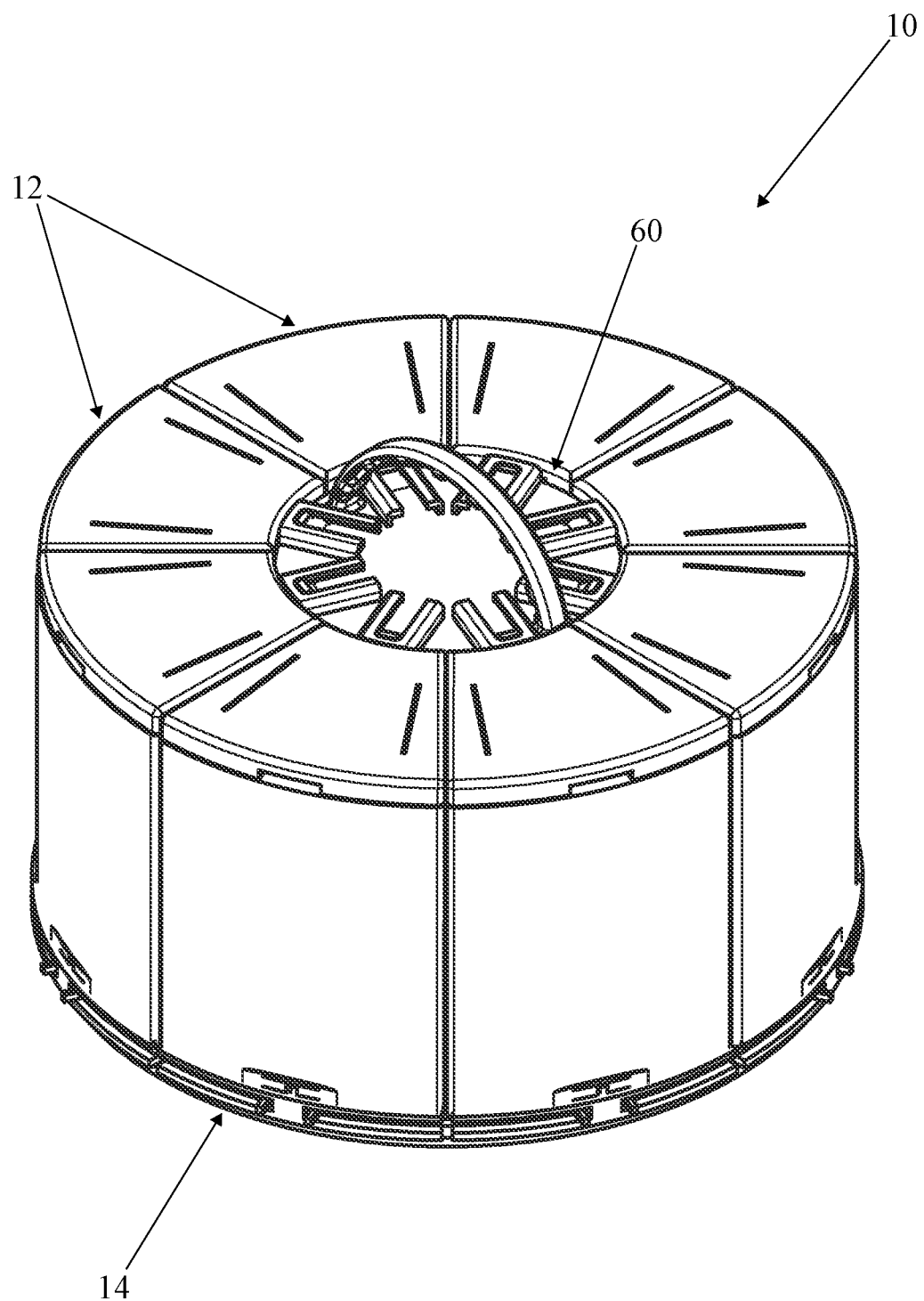
FIG. 1 is a front perspective view of a version of the application.
Figure 2:
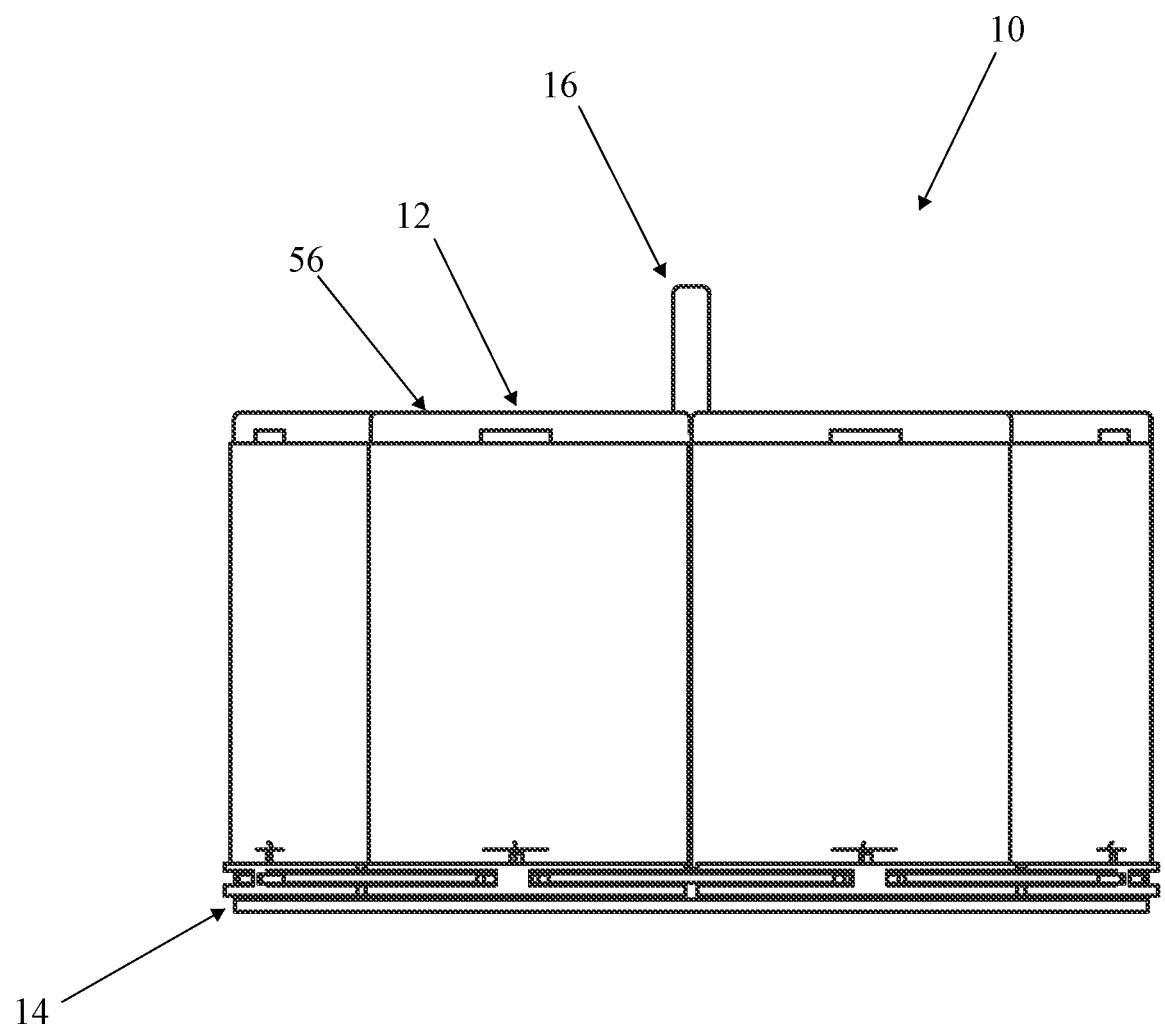
FIG. 2 is a side elevation view of a version of the application shown in FIG. 1.
Figure 3:
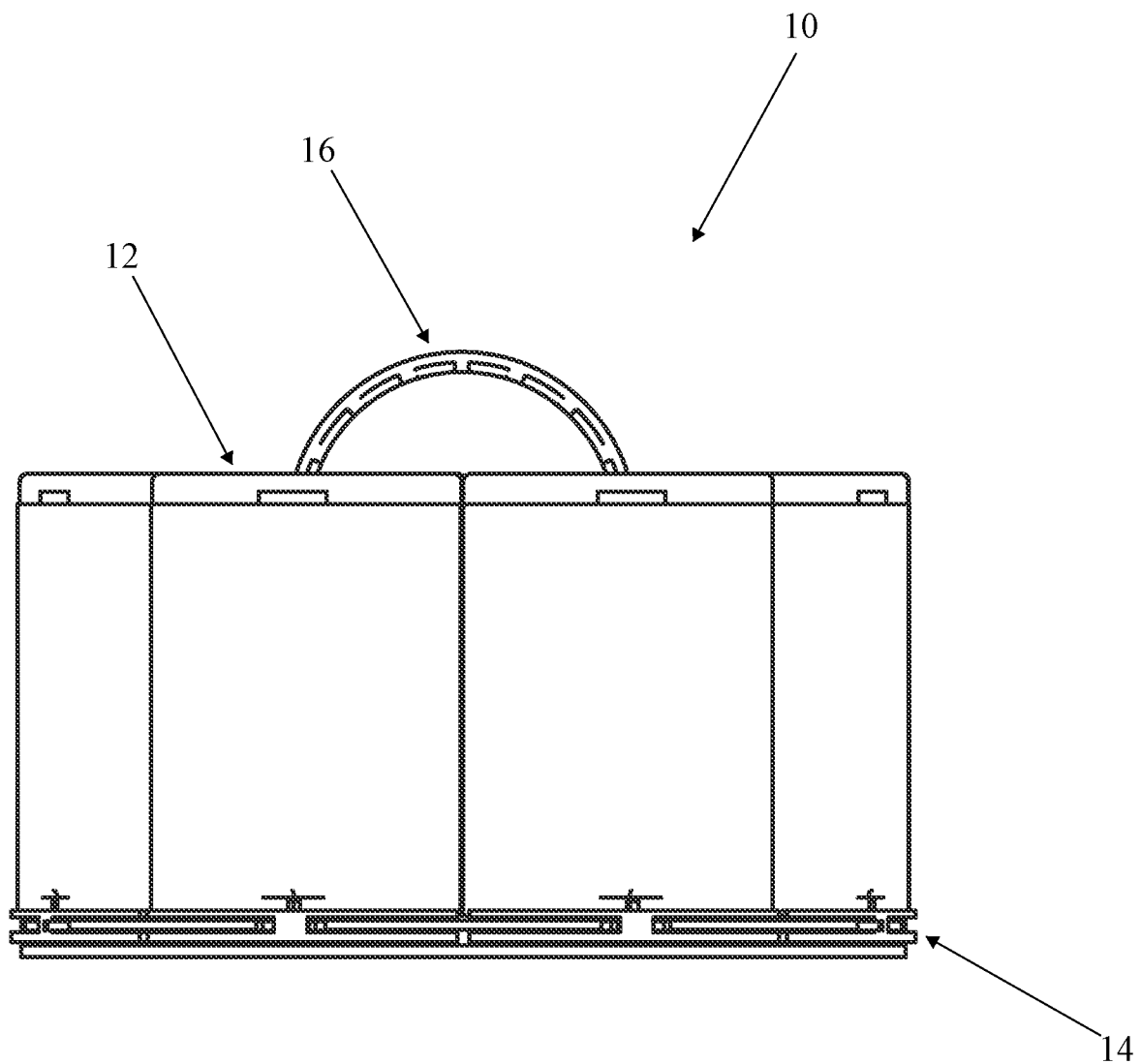
FIG. 3 is a second side elevation view of a version of the application of the version shown in FIG. 1.

With reference to the figures, particularly FIG. 1, a general description of a version of the invention will be provided. As illustrated, a modular pastry packaging carousel 10 is disclosed which is configured to accommodate a cylindrical pastry item, such as a cake or pie, which has been presliced into a plurality of sectors or wedge-shaped segments. Generally, the modular pastry packaging carousel 10 is configured to support a plurality of pastry modules 12 in a radial configuration. Each of the modules 12 are designed to seal therein and individually contain the wedge-shaped segments of pastry. In the illustrated version, there are a total of eight (8) modules each having approximately 45 degrees of angle.

With reference to FIG. 1-FIG. 6, in the illustrated version, the modular pastry packaging carousel 10 generally comprises a base tray assembly 14, a plurality of pastry modules 12 supported by the base tray 14, and a removable handle carrier 16.

Figure 5:
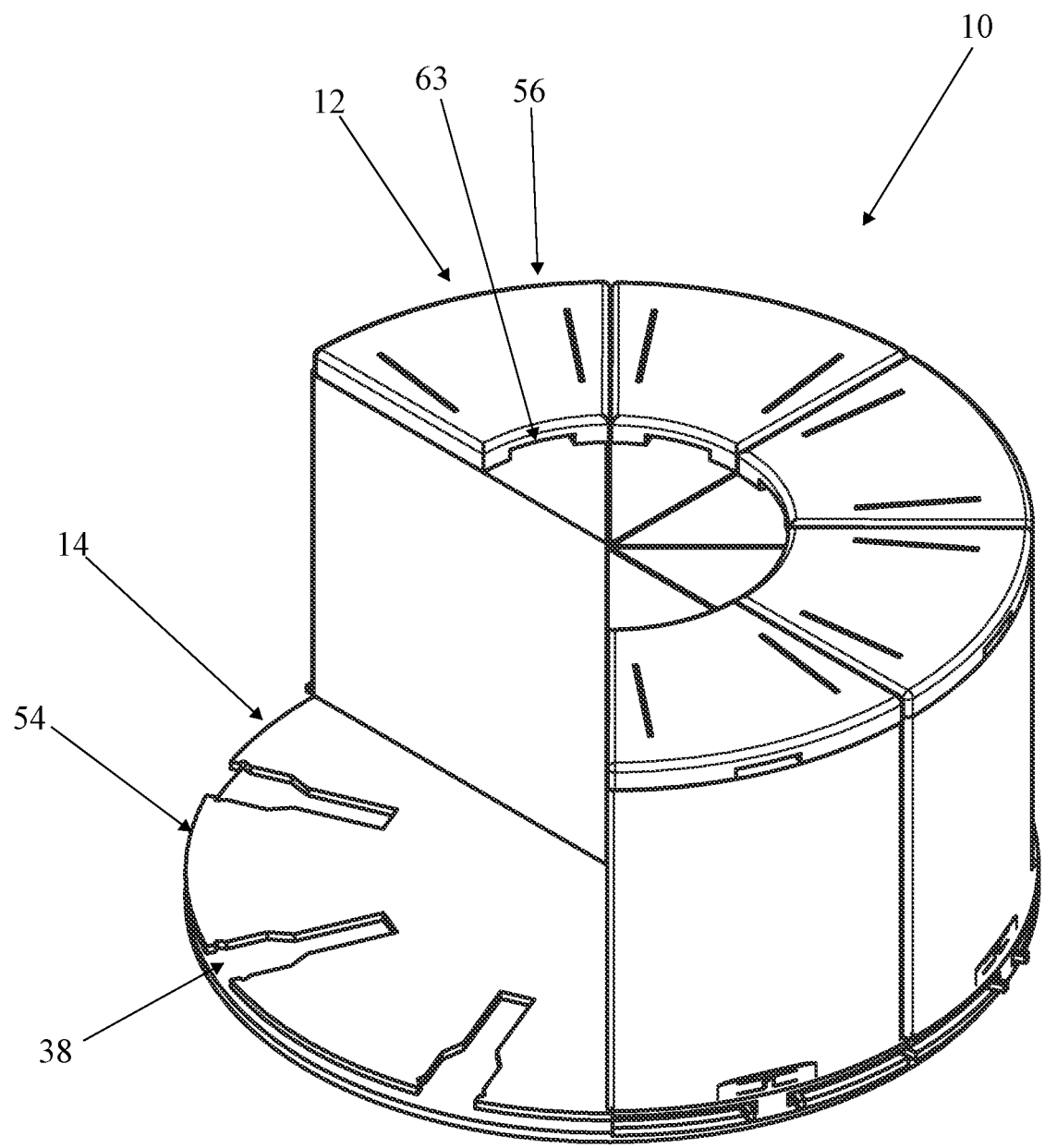
FIG. 5 is a side perspective view of the version shown in FIG. 1 shown with several pastry modules removed from the base tray.
Figure 6:
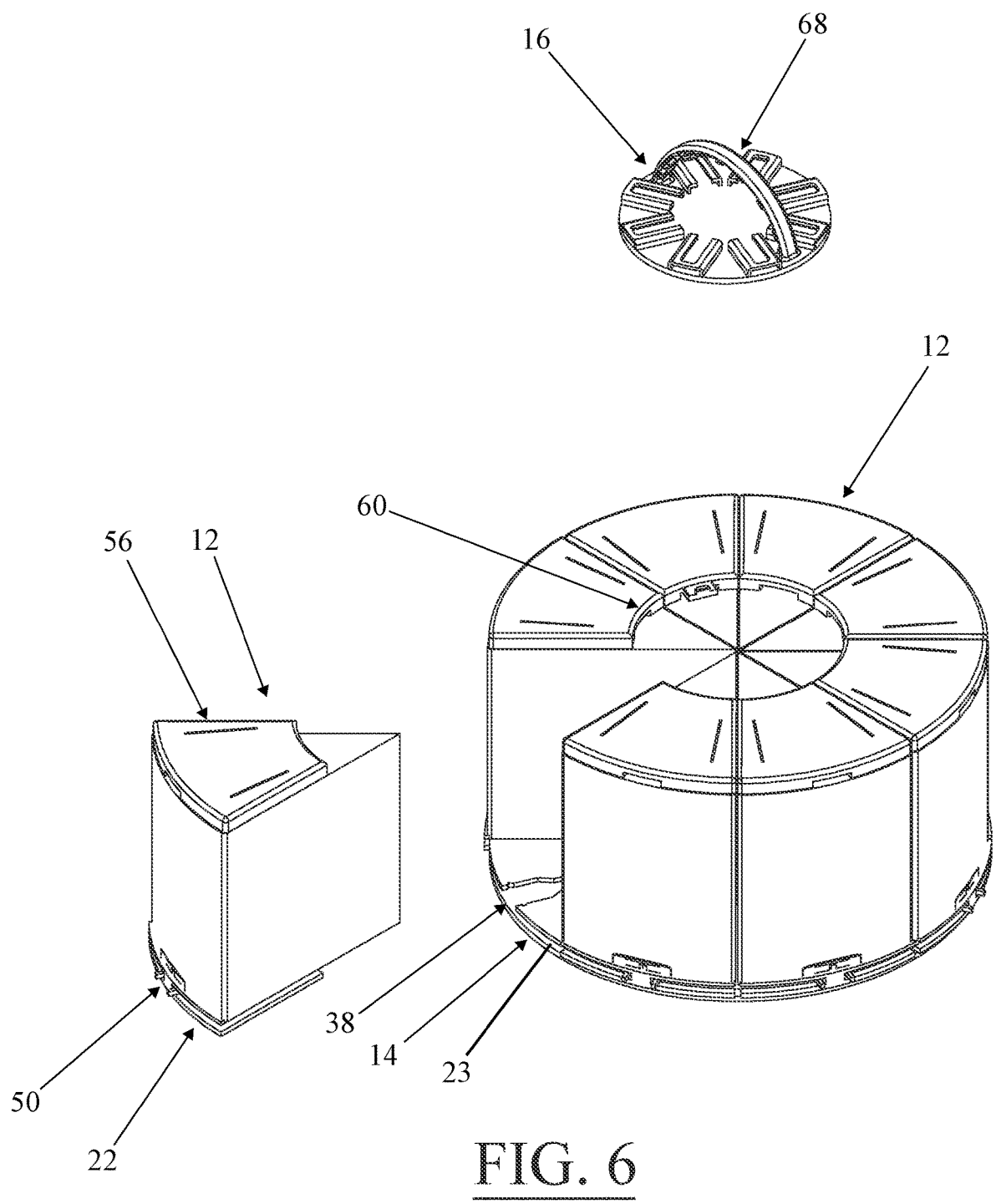
FIG. 6 is a side perspective view of the version shown in FIG. 1 shown with a pastry module removed from the base tray and the handle carrier removed from the plurality of pasty modules.
Figure 7:
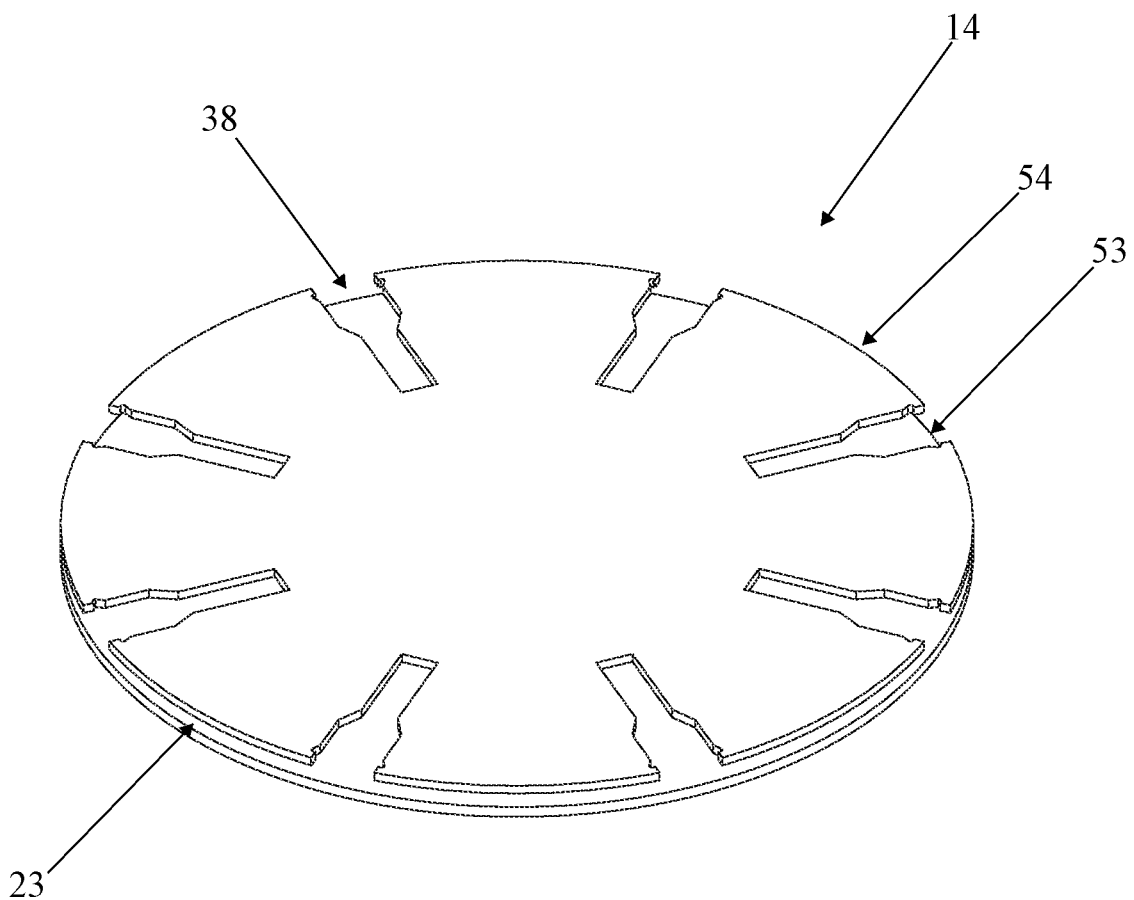
FIG. 7 is a side perspective view of the base tray assembly of the version shown in FIG. 1.
Figure 8:
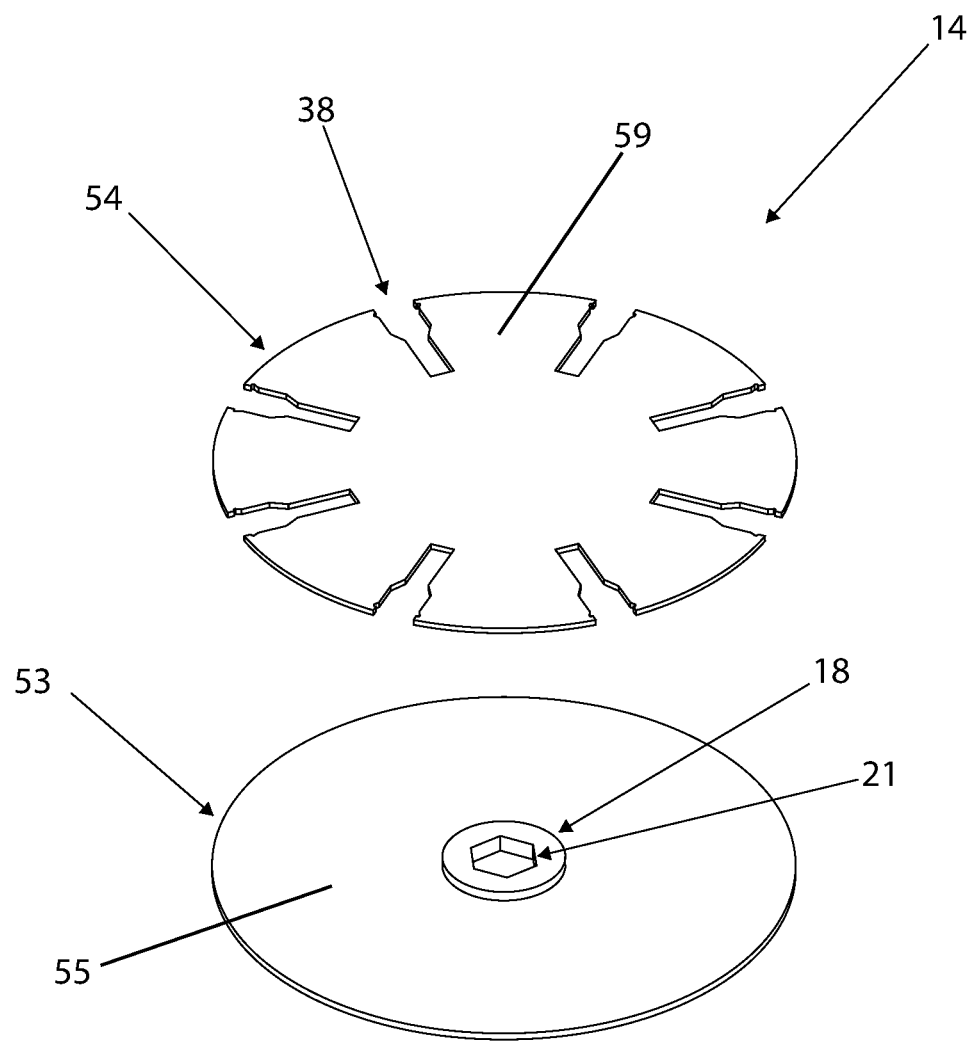
FIG. 8 is a side perspective view of the base tray assembly unassembled of the version shown in FIG. 1.
Figure 9:
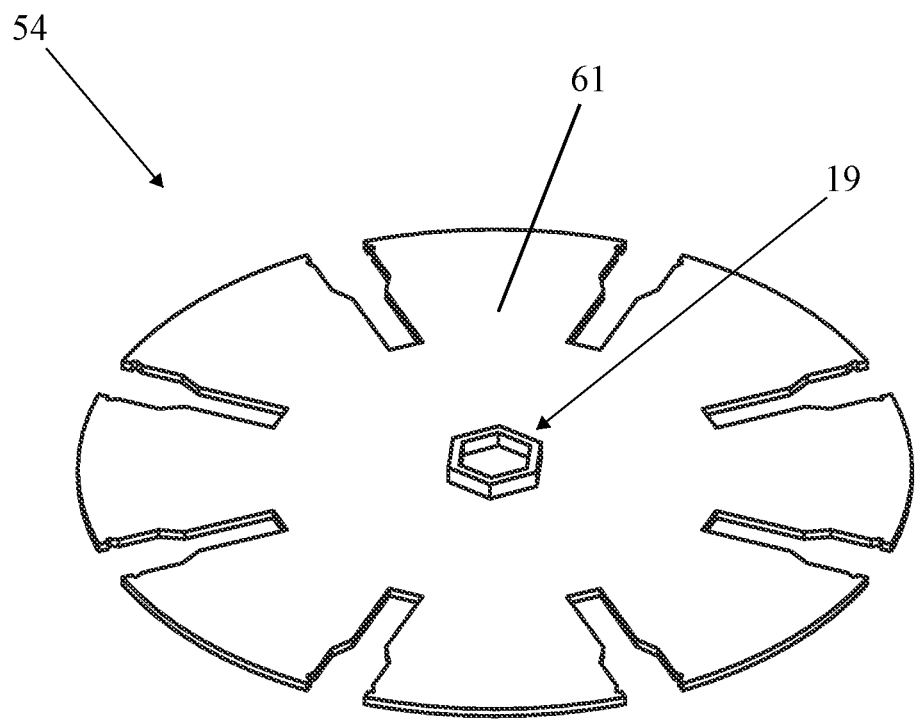
FIG. 9 is a bottom perspective view of the top plate of the base tray assembly of the version shown in FIG. 1.
Figure 10:
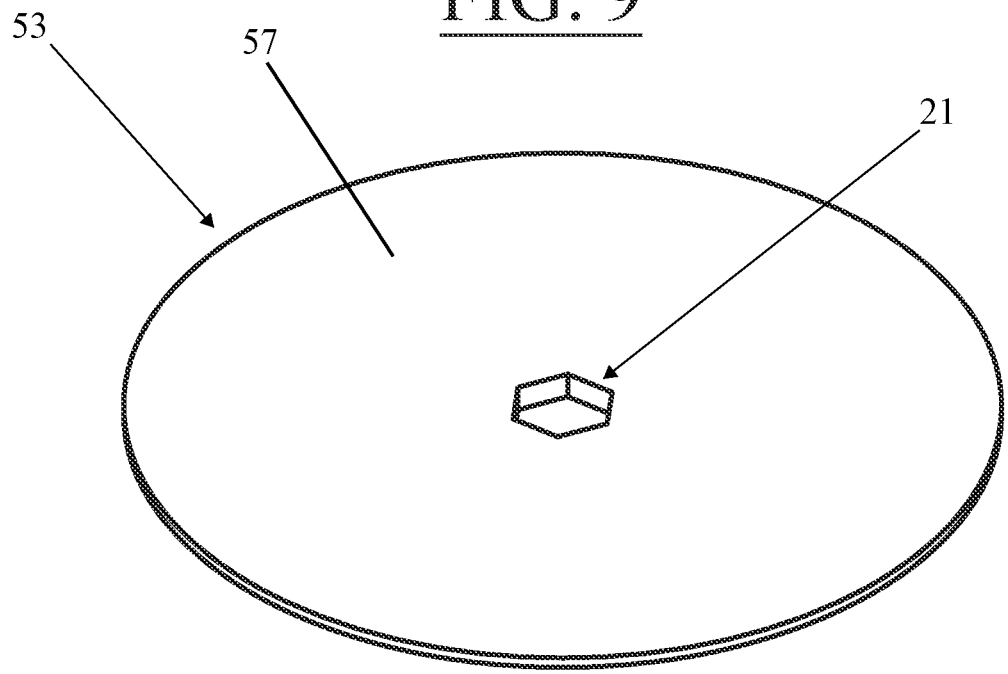
FIG. 10 is a bottom perspective view of the bottom plate of the base tray assembly of the version shown in FIG. 1.

As shown in FIG. 5-FIG. 11, the base tray assembly 14 is preferably in the form of a disc having a constant radius R. The base tray 14 provides support for the entirety of the modular pastry packaging carousel 10 and the pastry modules 12 in a radial configuration. In the illustrated version, the base tray assembly 14 comprises a bottom plate 53 and a top plate 54. The bottom plate 53 has a top surface 55 and a bottom surface 57 which are generally flat in nature. The bottom plate 53 top surface 55 further provides an upward extending outcropping 18 having a central aperture 21. The top plate 54 has a top surface 59 and a bottom surface 61 which are generally flat in nature. The top plate 54 bottom surface 55 further provides a downward extending outcropping 19. The bottom plate 53 is configured to support and connect with the top plate 54 there above by reciprocally coupling the top plate 54 downward extending outcropping 19 (See FIG. 7) with the bottom plate 53 upward extending outcropping 18. In the version, the bottom plate 53 upward extending outcropping 18 or spacer is shaped as a circular disc having a depth and a hexagonal aperture 21 sized to receive the top plate 54 downward extending aperture 19 reciprocally shaped as a hexagon which fits into the hexagonal aperture 21. As shown in FIG. 7, when the bottom plate 53 and the top plate 54 are connected the depth of the upward extending outcropping 18 disc provides a narrow radial gap 23 between the plates.

With reference to FIG. 13-FIG. 20, each of the pastry modules 12 defines and forms a wedge-shaped container having a cover portion 20 and a sector-shaped removable base 22 (FIG. 16) which encloses the open bottom 29 of the cover portion 20 and provides a surface 24 for supporting a respective wedge-shaped pastry item 90 thereon. In certain versions, the pastry module further includes an attachment slot assembly 56 comprising a radially extending slot 63 therein for receiving a respective radial attachment switch 66 which will be described in further detail below. The attachment slot assembly 56 includes a front curved face 80 providing the entrance to the radially extending slot 63. Collectively, while the pastry modules 12 are all mounted to the base tray 14, the attachment slot assembly forms a circular seat for the removable handle carrier 16.

Figure 13:
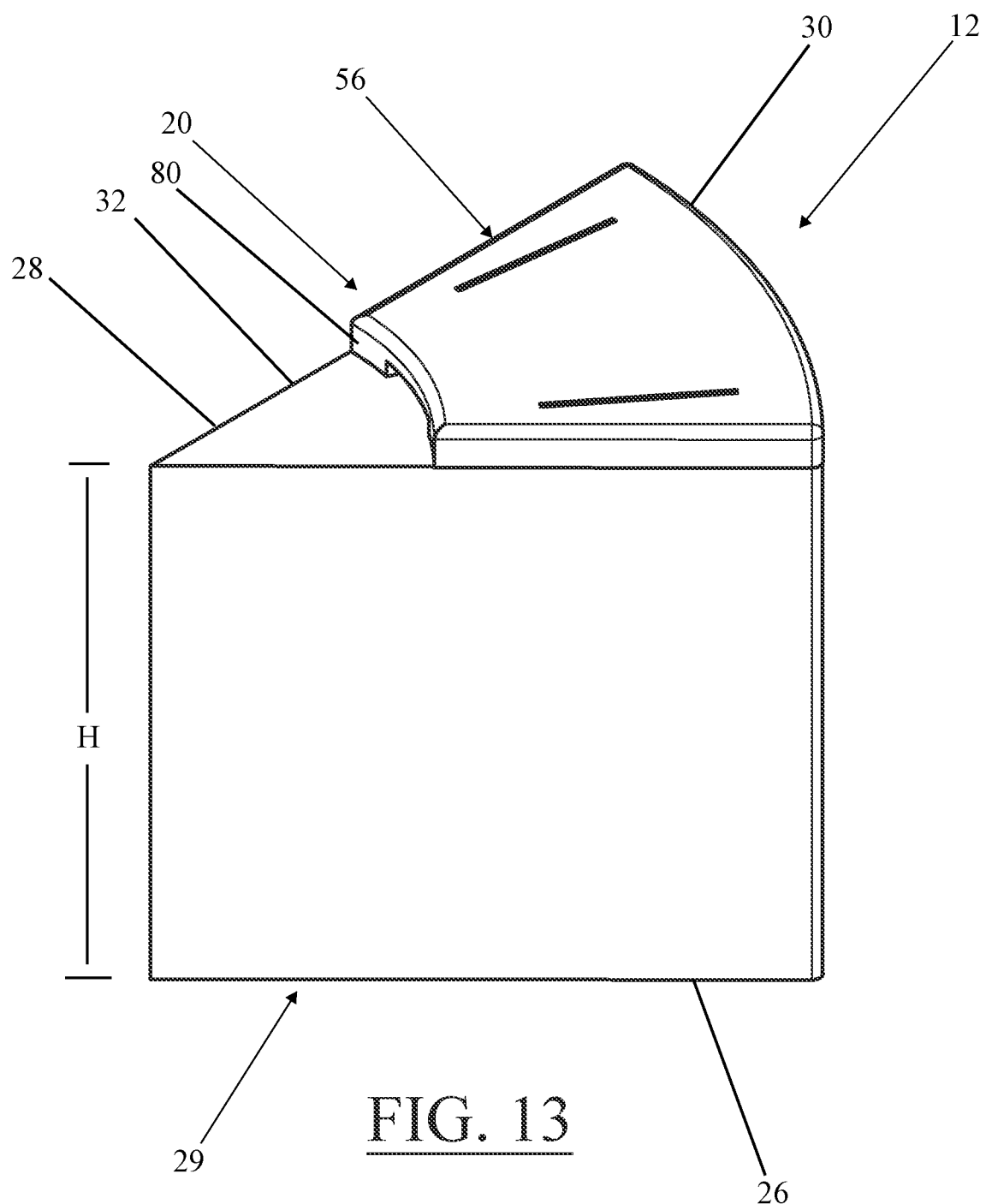
FIG. 13 is a side perspective view of a version of the pastry module cover portion.
Figure 14:
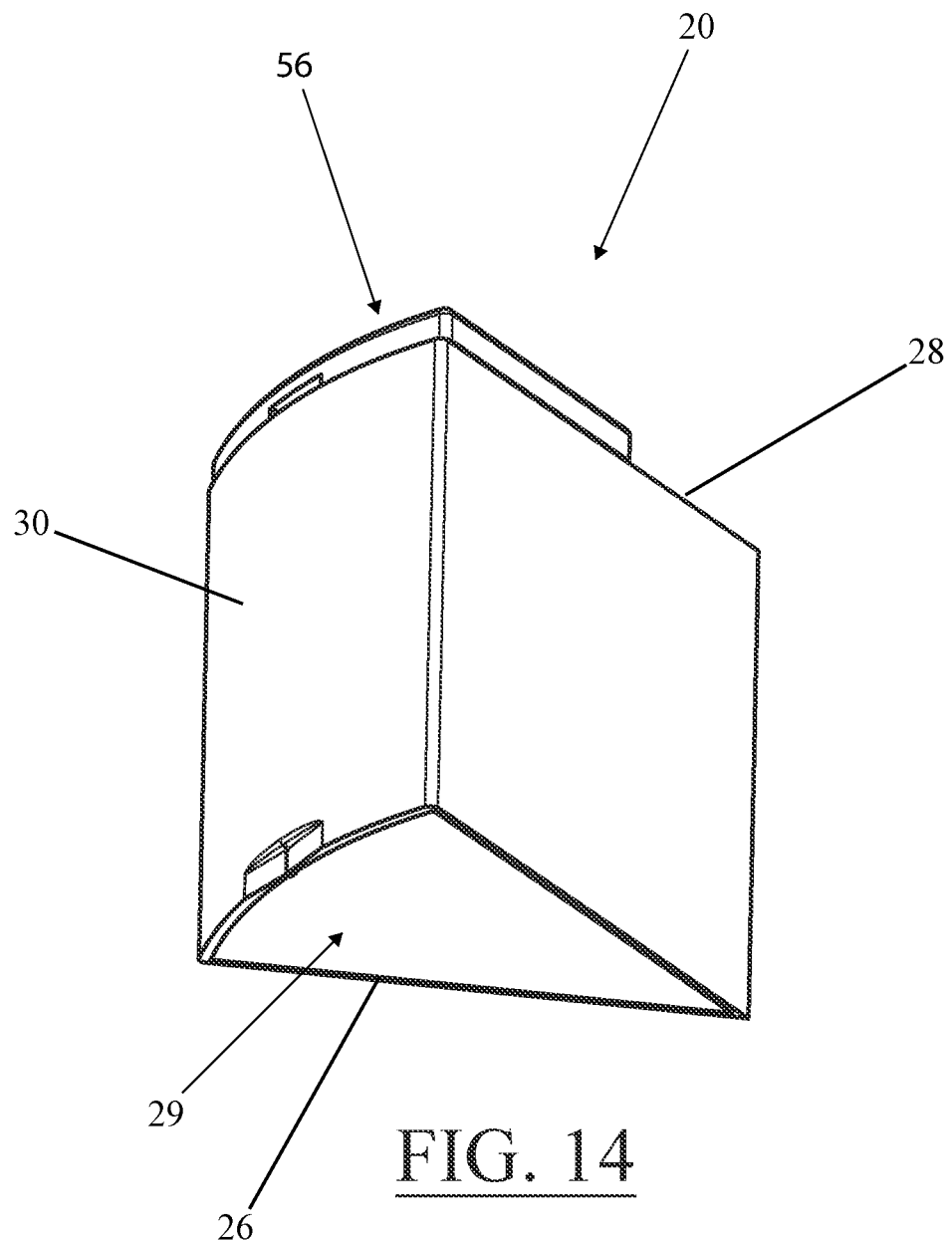
FIG. 14 is a bottom side perspective view of a version of the pastry module cover portion shown in FIG. 13.
Figure 15:
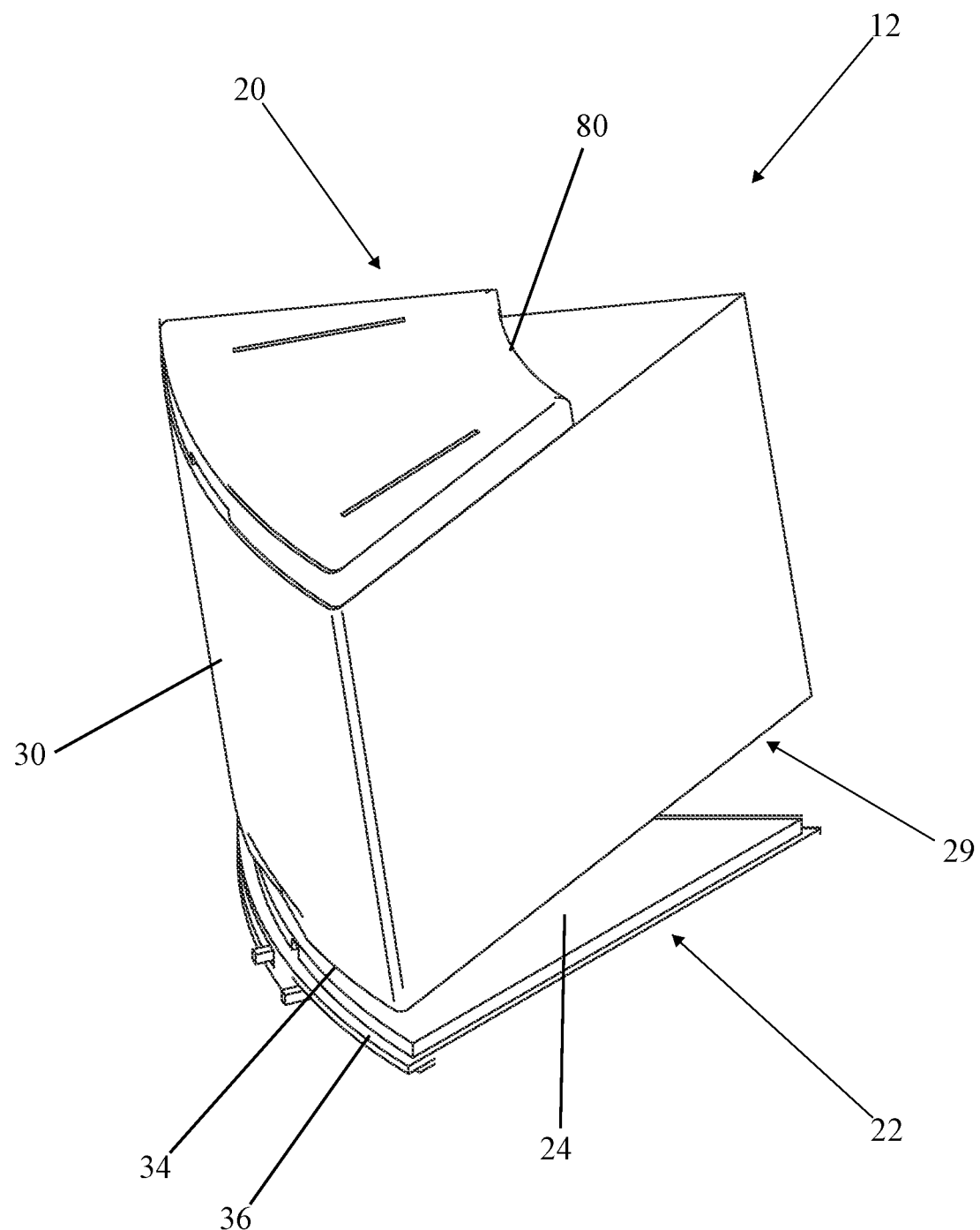
FIG. 15 is a side perspective view of the pastry module cover portion attaching to the removable base of the version shown in FIG. 13.
Figure 16:
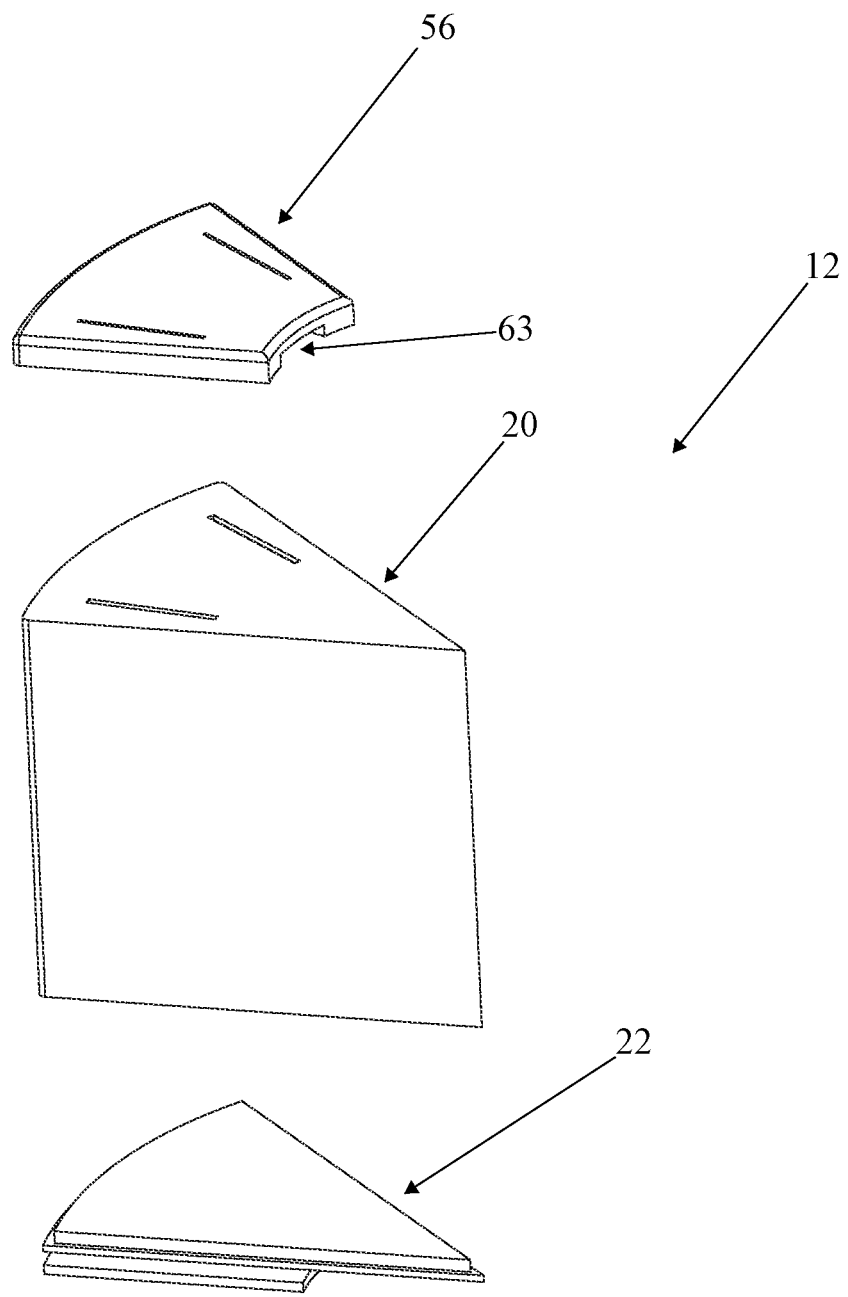
FIG. 16 is an exploded view of the pastry module of the version shown in FIG. 13.
Figure 17:
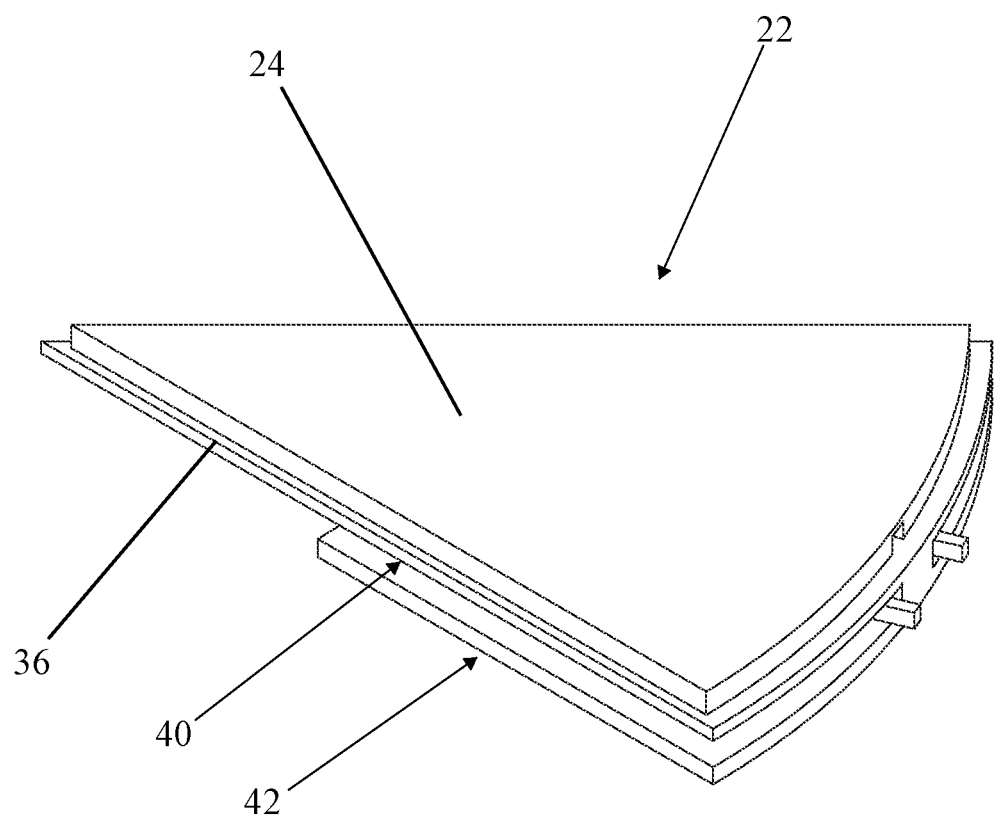
FIG. 17 is a top perspective view of the removable base of the pastry module.
Figure 18:
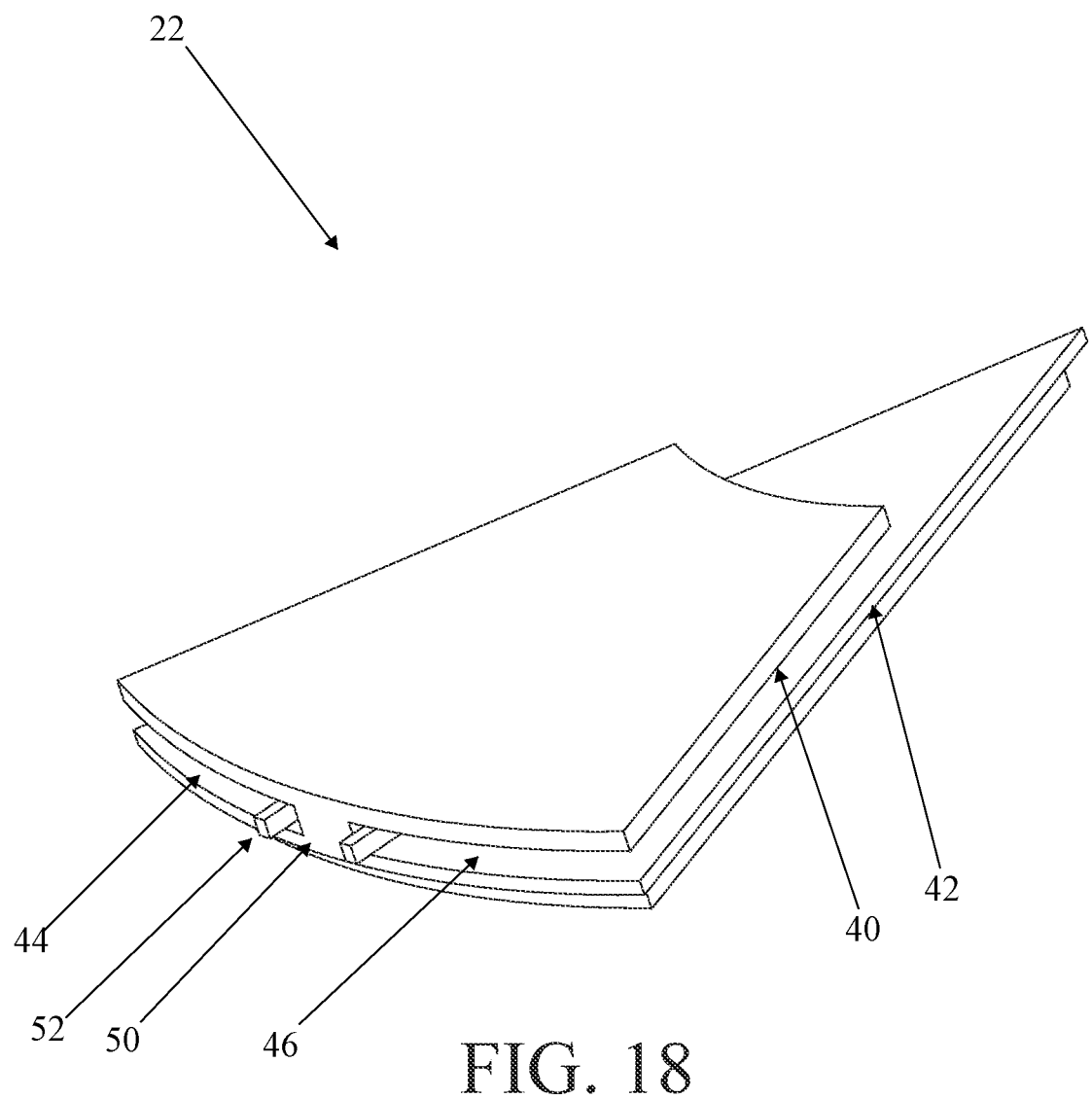
FIG. 18 is a bottom perspective view of the removable base of the pastry module shown in FIG. 17.
Figure 19:
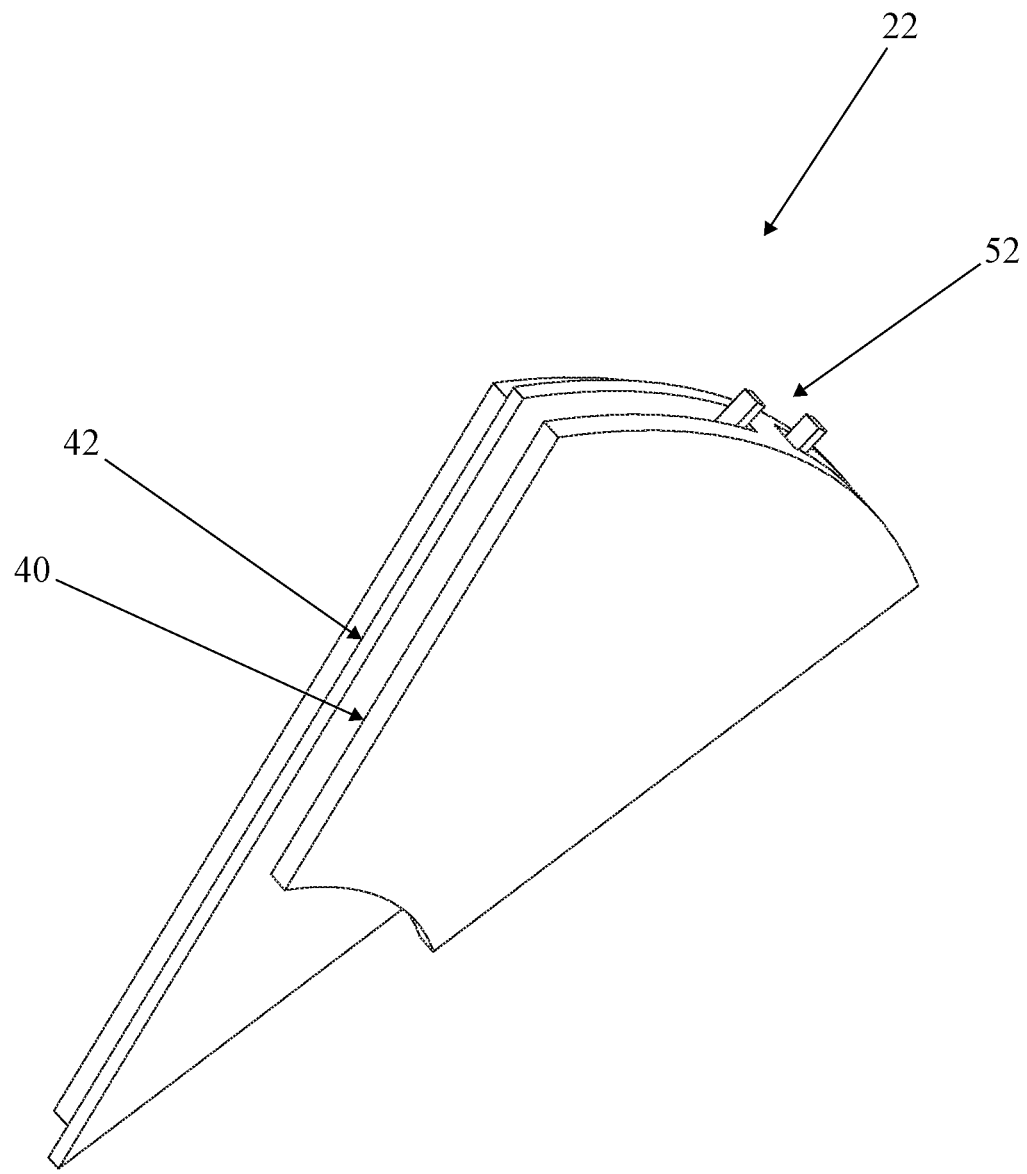
FIG. 19 is a bottom perspective view of the removable base of the pastry module shown in FIG. 17.
Figure 20:
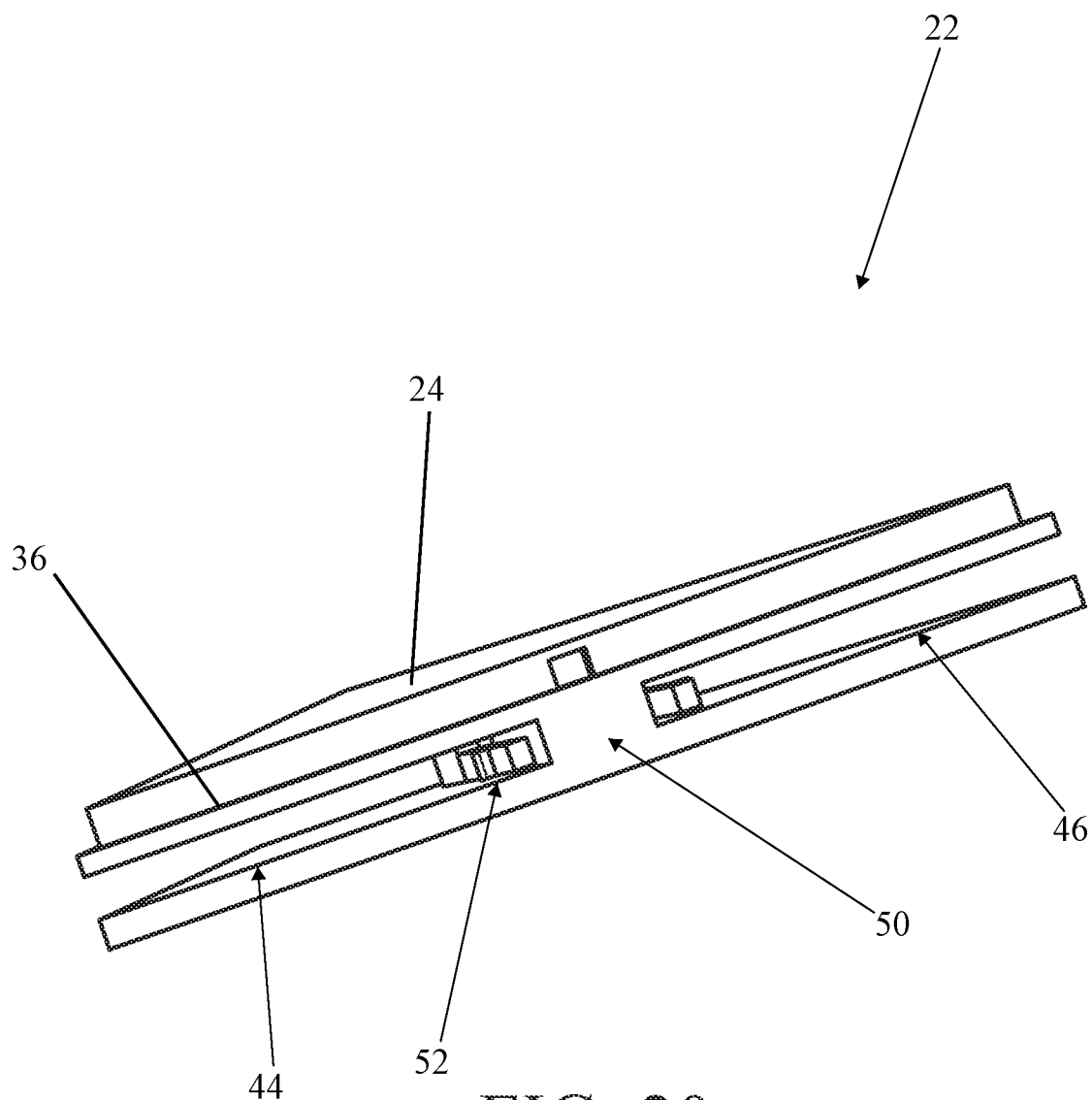
FIG. 20 is a side perspective view of the removable base of the pastry module shown in FIG. 17.

In the illustrated version, particularly with reference to FIG. 13-FIG. 15, the cover portion 20 generally comprises a first radial wall 26, a second radial wall 28, an arced-shaped rear wall 30, and a sector-shaped top 32. The cover portion 20 forms a wedge-shaped enclosure having a height H and radius sufficient to extend over and around a respective wedge-shaped pastry item contained therein.

As shown in FIG. 16-20, the removable base 22 is in the form of a sector-shape which is similar to the cross-section of the cover portion 20. The removable base 22 provides a perimeter ledge 36 defining the top surface 24 therebetween. The bottom perimeter 34 (See FIG. 15) of the cover portion 20 is shaped to seat and mate with the reciprocally shaped removable base 22 perimeter ledge 36. Thereby once connected, typically by way of a snap or friction-type fit, the removable base 22 and the cover portion 20 form the pastry module 12 providing a completely sealed compartment for storage of the respective wedge-shaped pastry item.

In certain versions of the application, each of the pastry modules 12 is configured to be attachably removable from the base tray 14. With reference to FIG. 7, the base tray 14 comprises a plurality of radial connection channels 38 within the top plate 54 for receiving and securing each respective pastry module 12. In the version, the removable base 22 of the pastry modules 12 is configured to engage with each respective radial connection channels 38 (See FIG. 6 and FIG. 11) by way of a means for selectively engaging the pastry module 12 with the base tray 14 radial connection channel 38. In the illustrated version, the means for selectively engaging the pastry module with the base tray 48 is integral within the structure of the removable base 22 itself and also utilizes a pair of squeeze tabs 52 for engagement with the radial connection channels 38 of the base tray 14. With reference to FIG. 16-FIG. 19, the removable base 22 means for selectively engaging the pastry module 48 comprises a top sector-shaped plate 40 and a bottom connection plate 42 which is positioned parallel and below the top sector-shaped plate 40. The bottom connection plate 42 is positioned below the top sector-shaped plate 40 a defined distance which forms a first wedge-shaped connection slot 44 and a mirrored second wedge-shaped connection slot 46. Further, a pair of opposing squeeze tabs 52 are utilized to secure by way of snap-fit the removable base 22 to the base tray 14. The pair of opposing squeeze tabs 52 are integrated along the spine 50 that connects the top sector-shaped plate 40 with the bottom connection plate 42. In more detail, the pair of opposing squeeze tabs 52 which engage and secure with the reciprocal shape of the radial connection channels 38 as the removable base 22 is connected with the base tray 14. In the illustrated version, the opposing squeeze tabs 52 have outward extending tabs configured to engage and snap-fit with the notches embedded within the opposing perimeters of the respective radial connection channels.

Figure 11:
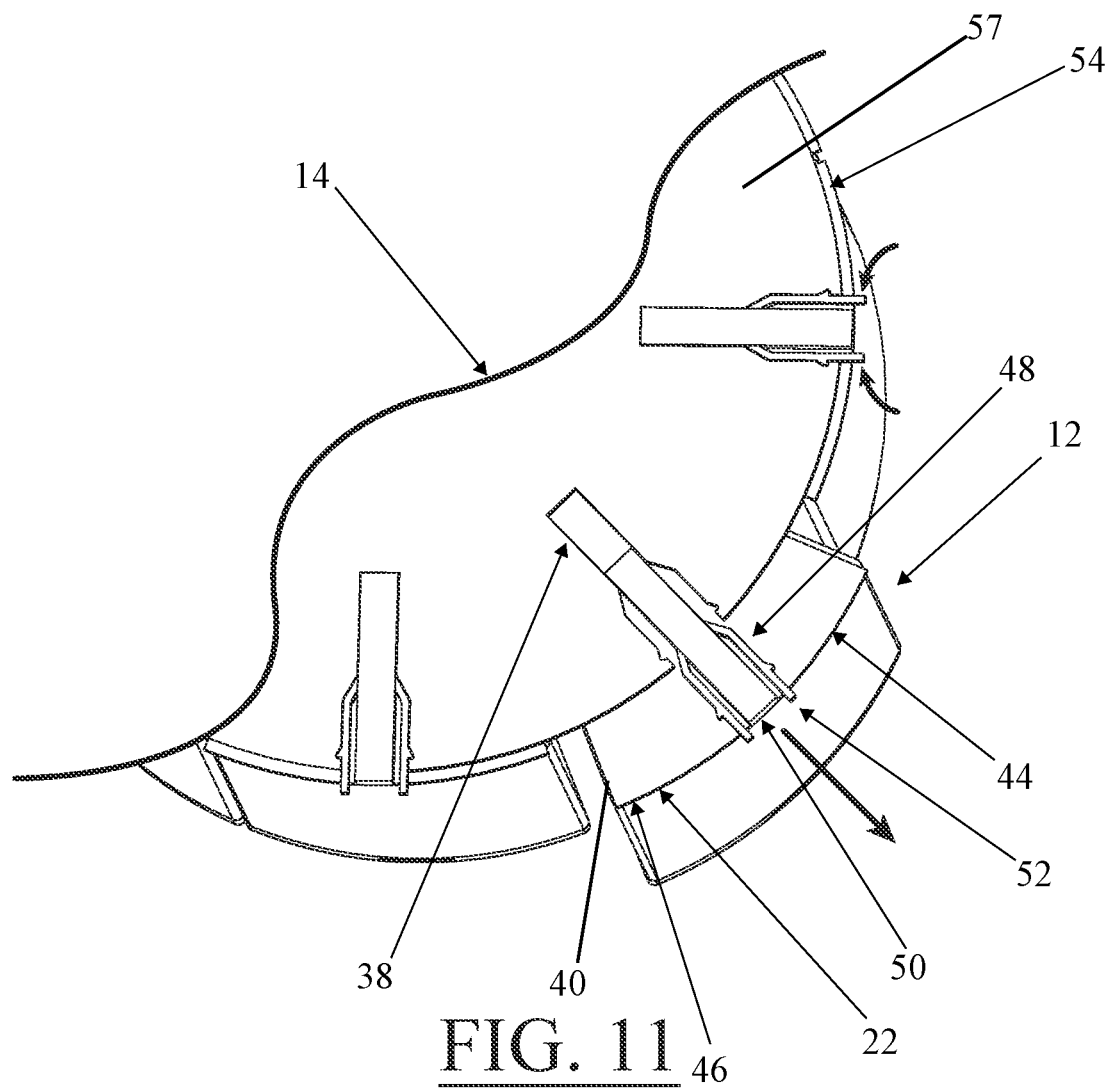
FIG. 11 is a bottom perspective view of the bottom plate of the base tray shown while engaging a pastry module within a respective radial channel of the version shown in FIG. 1.
Figure 12:
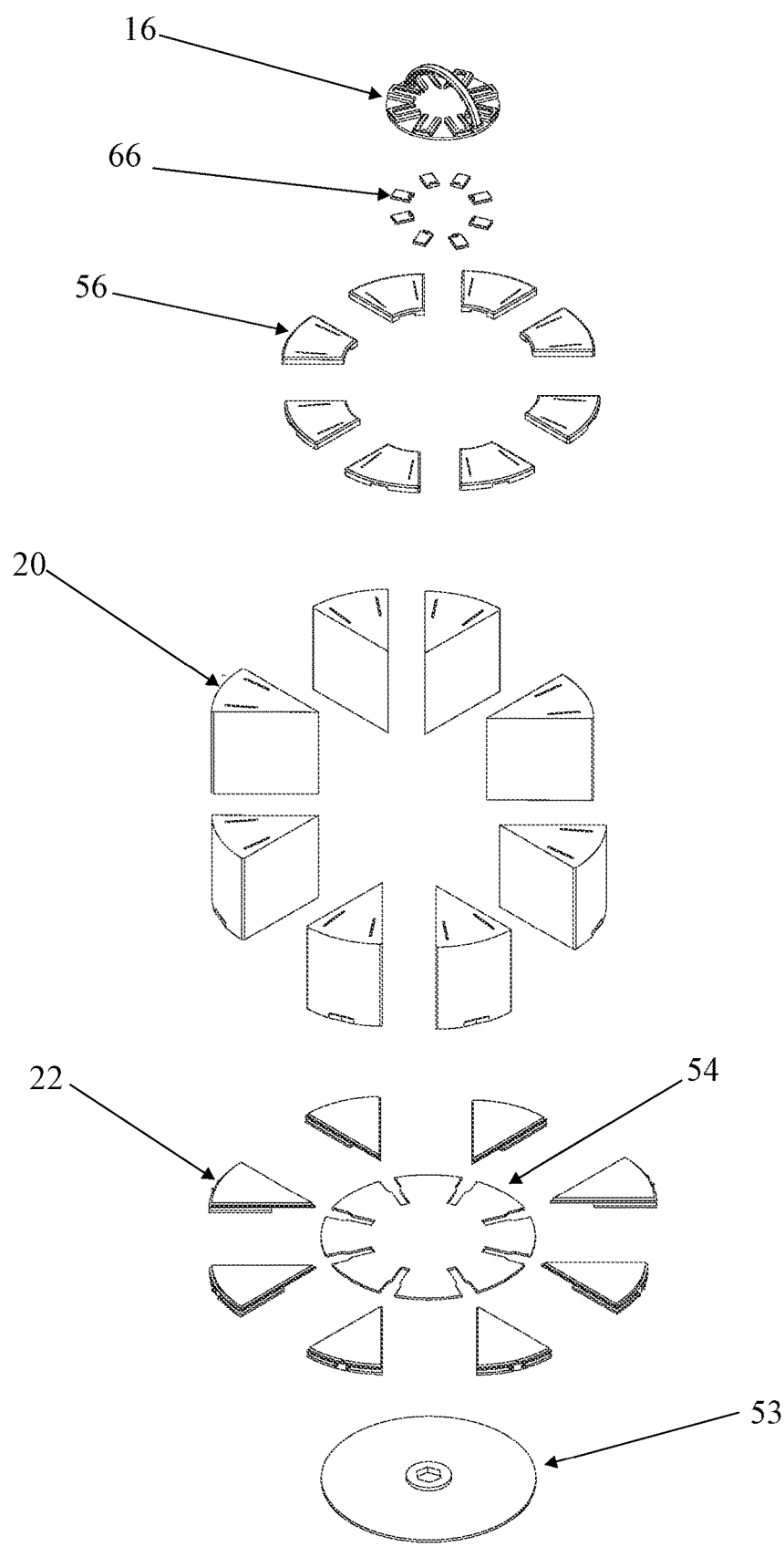
FIG. 12 is an exploded view of the version shown in FIG. 1.

As shown in FIG. 5, FIG. 6, and FIG. 11, during the process of connecting a respective pastry module 12 to the base tray 14, the spine 50 of the removable base 22 is lined up with the respective radial connection channels 38 and is moved forward. Wherein, the first wedge-shaped connection slot 44 and the mirrored second wedge-shaped connection slot 46 receive and sandwich the top plate 54 of the base tray 14 therein and the spine 50 engages lengthwise with the respective radial connection channels 38. Once positioned, the pair of opposing tabs 52 expand to lock into position, gripping the radial connection channels 38 of the base tray 14. Each of the pastry modules 12 can be positioned onto the base tray 14 in this manner, sequentially in a radial pattern about the central aperture 18 of the base tray 14 (See FIG. 11).

Figure 4:
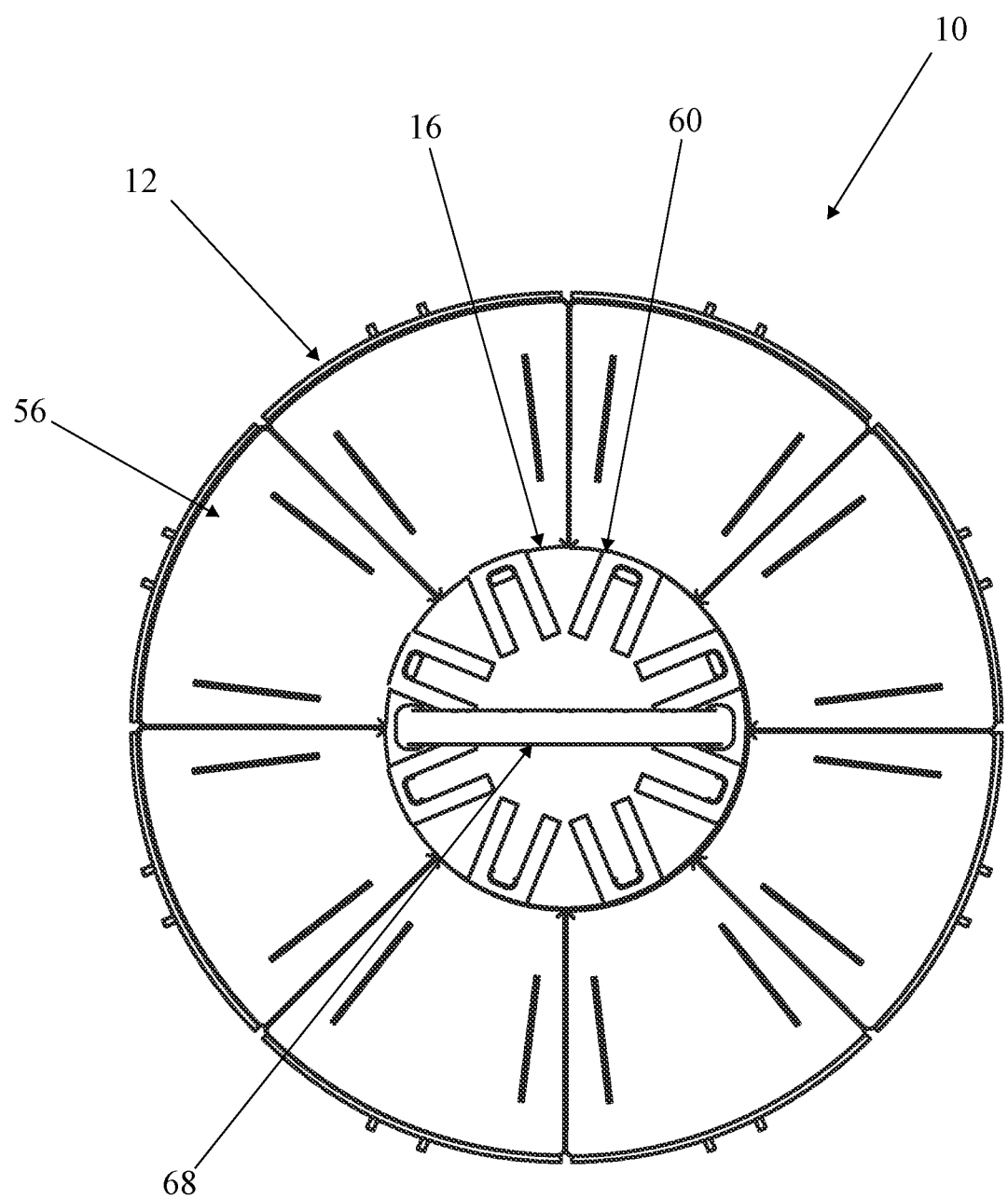
FIG. 4 is a top plan view of the version shown in FIG. 3.

With reference to FIG. 21-FIG. 24B, the attachably removable handle carrier 16 is utilized to carry the entirety of the modular pastry packaging carousel 10 from point A to point B. The removable handle carrier 16 is designed to be attachably removable to the plurality of wedge-shaped pastry modules 12 while mounted to the base tray assembly 14. For example, as best shown in FIG. 4, the removable handle carrier 16 is configured to radially connect to the plurality of pastry modules 12 which are connected to the base tray 14. Collectively, the plurality of pastry modules 12 form a circular seat 60 which is sized to receive and seat the removable handle carrier 16 during operation (See FIG. 21).

A version of the removable handle carrier 16 comprises a radial plate 62 having a plurality of radial channels 64 formed by raised housings 67 and a plurality of respective radial attachment switches 66 slidable and coupled within a respective radial channel 64 formed within a housing 67, and a fixed handle 68. The respective radial attachment switches 66 are configured to move between a released position (FIG. 24A) to an extended engaged position (FIG. 24B) by way of a raised tab 71. Each of the pastry modules 12 further includes a removable handle carrier 16 attachment slot assembly 56 comprising a radially extending slot 63 (See FIG. 24A) which is configured to receive and interlock with the respective removable handle carrier 16 radial attachment switch 66 while in the extended engaged position.

Thus, during operation, the removable handle carrier 16 is positioned within the circular seat 60 formed by the collective pastry modules 12 and attachment slot assembly 56. Thereafter, the respective radial attachment switches 66 are moved to the extended engaged position (FIG. 24B), thereby engaging each of the respective attachment slot 56 as shown in FIG. 4.

With reference now to FIG. 27-FIG. 32, in an alternative embodiment of the modular pastry packaging carousel 10, a radial pastry slicer assembly 200 may be included which functions to slice a circular pastry into a plurality of wedge-shaped slices simultaneously. The radial pastry slicer assembly 200 generally comprises a plurality of radially positioned individual slicers 202 and an upper platform 204 for providing support for the radially positioned individual slicers 202 in a radial pattern.

Figure 29:
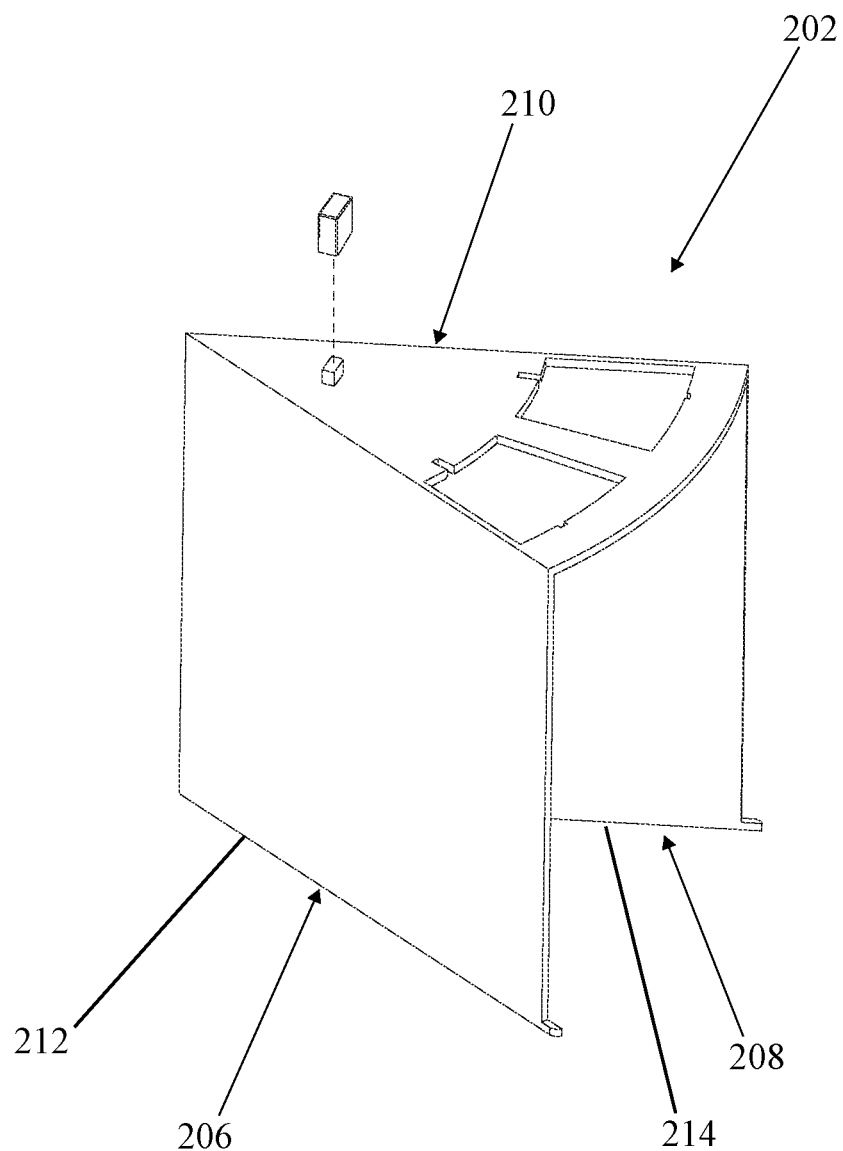
FIG. 29 is a side perspective view of a radially positioned individual slicer of the radial pastry slicer assembly shown in FIG. 27.

As shown in FIG. 29, each of the radially positioned individual slicers 202 may include a first radial wall 206, a second radial wall 208, and a sector-shaped top 210. The first radial wall 206 and the second radial wall 208 are radially angled with respect to the other and connecting at a forward edge 210. Each of the first radial wall 206 and the second radial wall 208 terminating at a first bottom cutting edge 212 and a second bottom cutting edge 214 respectively. The bottom cutting edges 212, 214 form a V sector-shape which is the shape of the cutting plane of the pastry during operation.

Figure 28:
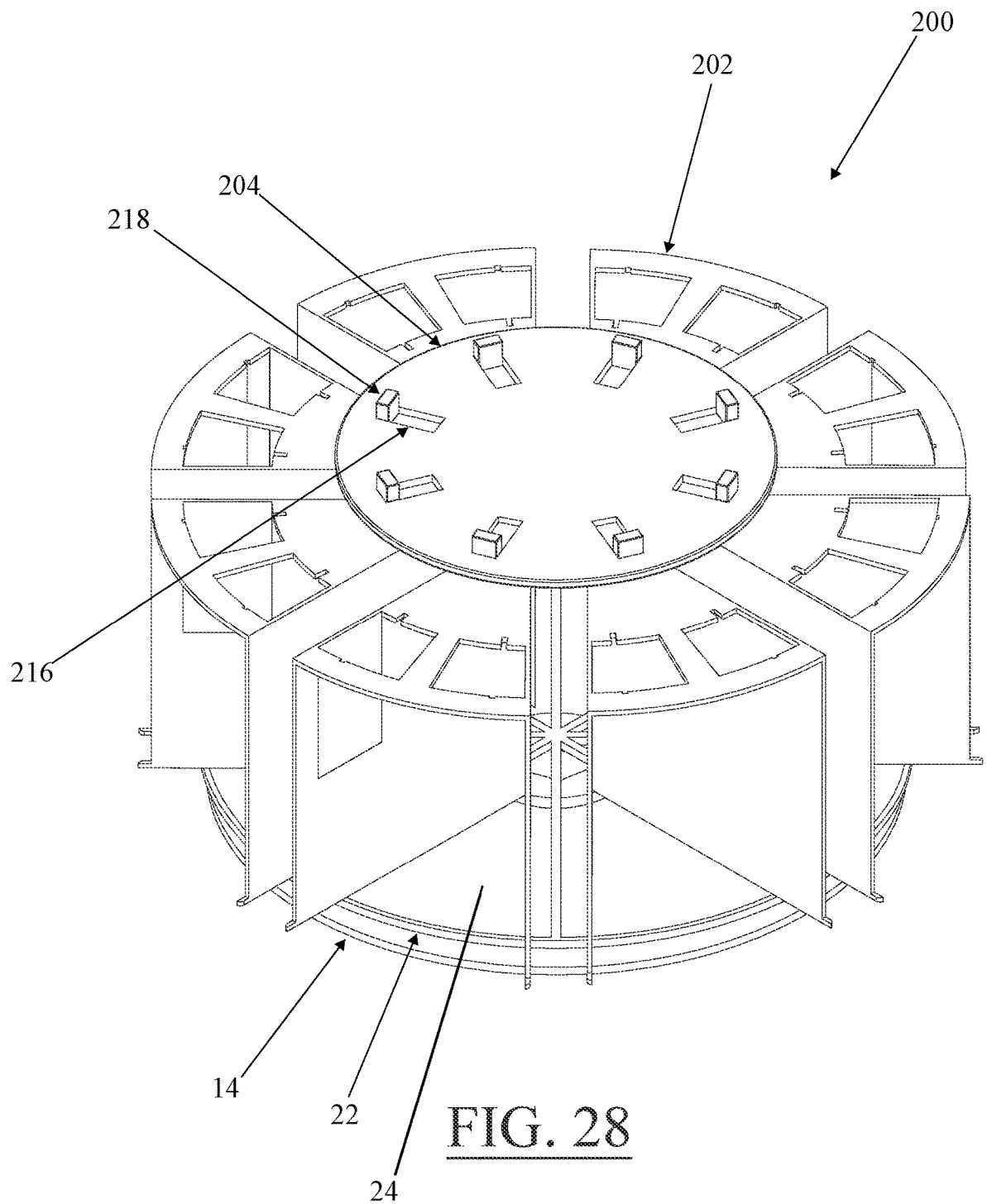
FIG. 28 is a top perspective view of a version of the radial pastry slicer assembly while in an extruded position shown in FIG. 27.
Figure 30:
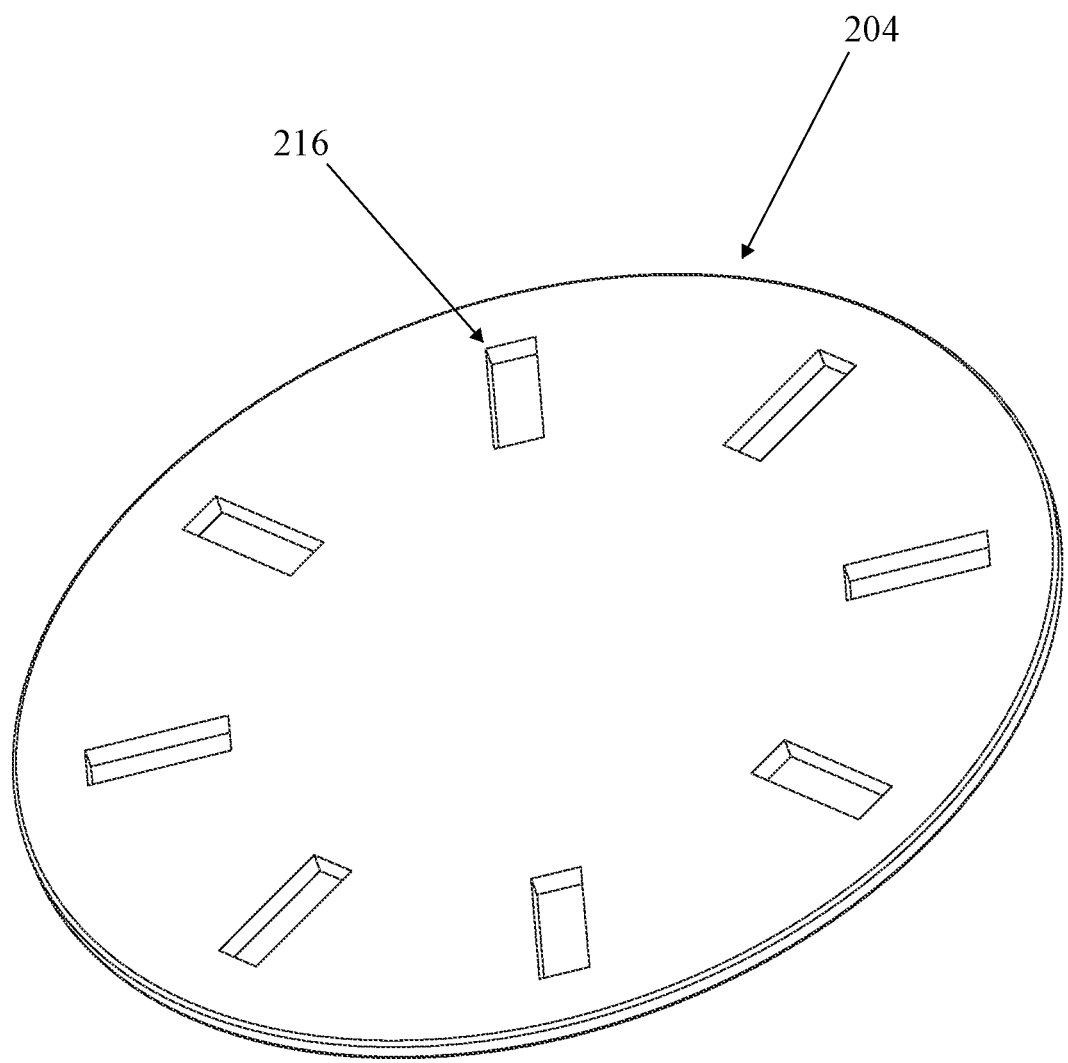
FIG. 30 is a top perspective view of the upper platform of the radial pastry slicer assembly.
Figure 31:
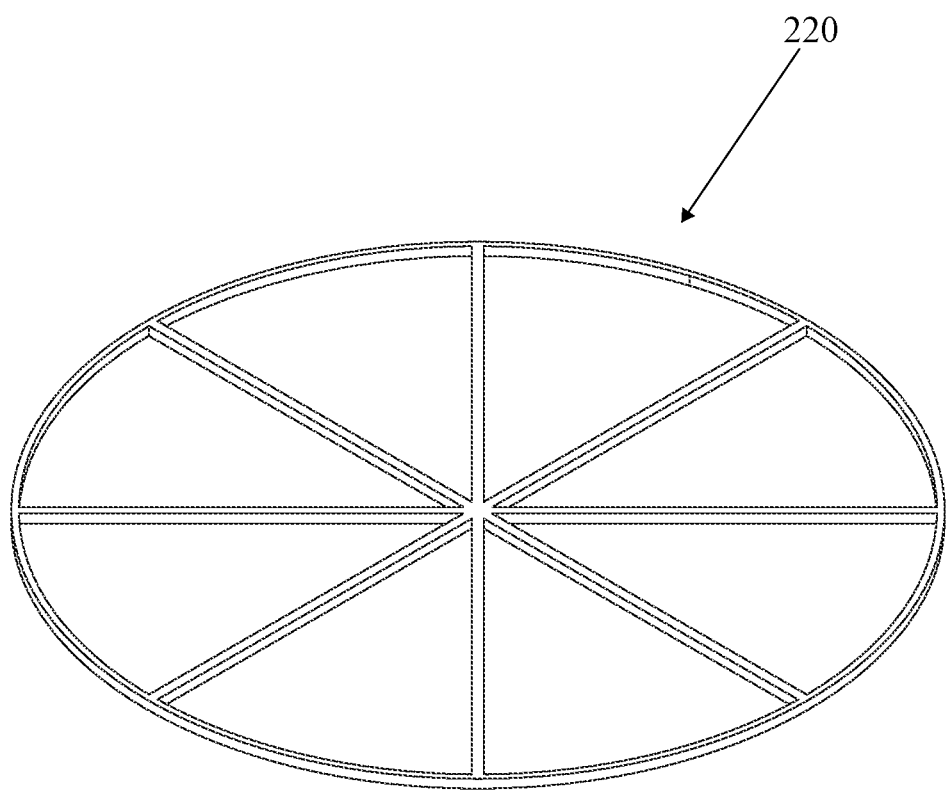
FIG. 31 is a top perspective view of the radial spacer.

As best shown in FIG. 30, the upper platform 204 may comprise a plurality of radially positioned guide channels 216 which operate to guide the radially positioned individual slicers 202 from a retracted position (FIG. 27) to an extruded position (FIG. 28). As shown, each sector-shaped top 210 of each of radially positioned individual slicers 202 includes a handle 218 which is positioned through a respective radially positioned guide channels 216. Thereby, each respective handle 218 can be utilized to slide each individual radially positioned individual slicers 202 between their respective retracted position and the extruded position. The purpose of providing the ability to move each respective radially positioned individual slicers 202 from the retracted position to the extruded position, is to provide the ability to selectively move a slice of pastry outward for purposes of serving or the ability to position a pastry on top of the surface 24 of the removable base 22.

Figure 32:
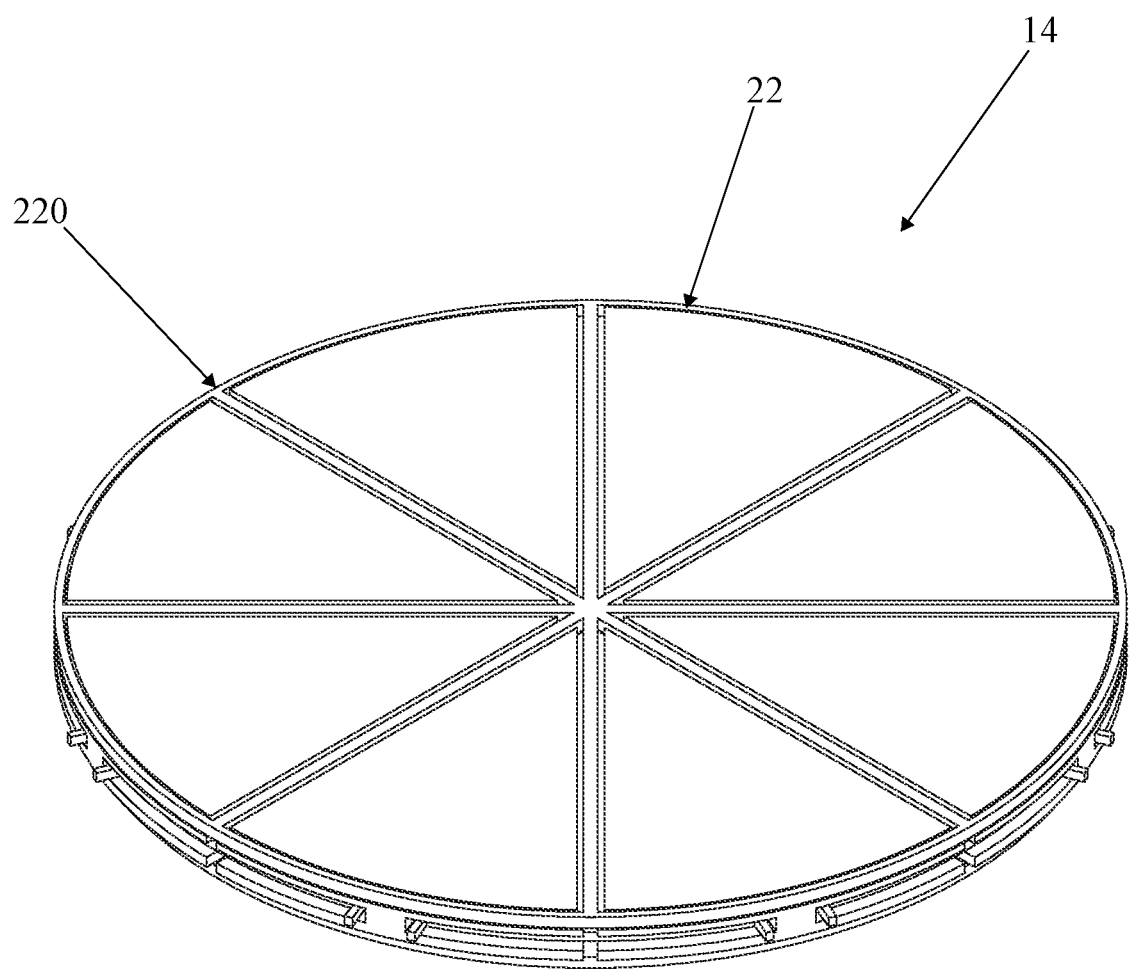
FIG. 32 is a top perspective view of the base tray with radial spacer attached.

Thus, during the operation of the radial pastry slicer assembly 200, the base tray 14 is prepared in a default position by loading the removable bases 22 having a surface 24 to each respective radial connection channels 38 (See FIG. 32). Thereafter, a radial spacer 220 is positioned onto the base tray 14 in order to fill the slots formed between the positioned removable bases 22 (See FIG. 31). The base tray 14 is now ready. A circular pastry such as a cake or pie is centrally placed on the base tray 14. Thereafter, the radial pastry slicer assembly 200, wherein the radially positioned individual slicers 202 are in the retracted position, is placed centrally over the pastry and moved downward (See FIG. 27). Thereby, slicing the pastry into distinct wedge-shaped slices which are radially positioned about the center of the base tray 14. Optionally, while the radial pastry slicer assembly 200 is positioned on the pastry, selectively, each of the radially positioned individual slicers 202 can be moved from the retracted position to the extruded position at the choice of the user (See FIG. 28).

Figure 21:
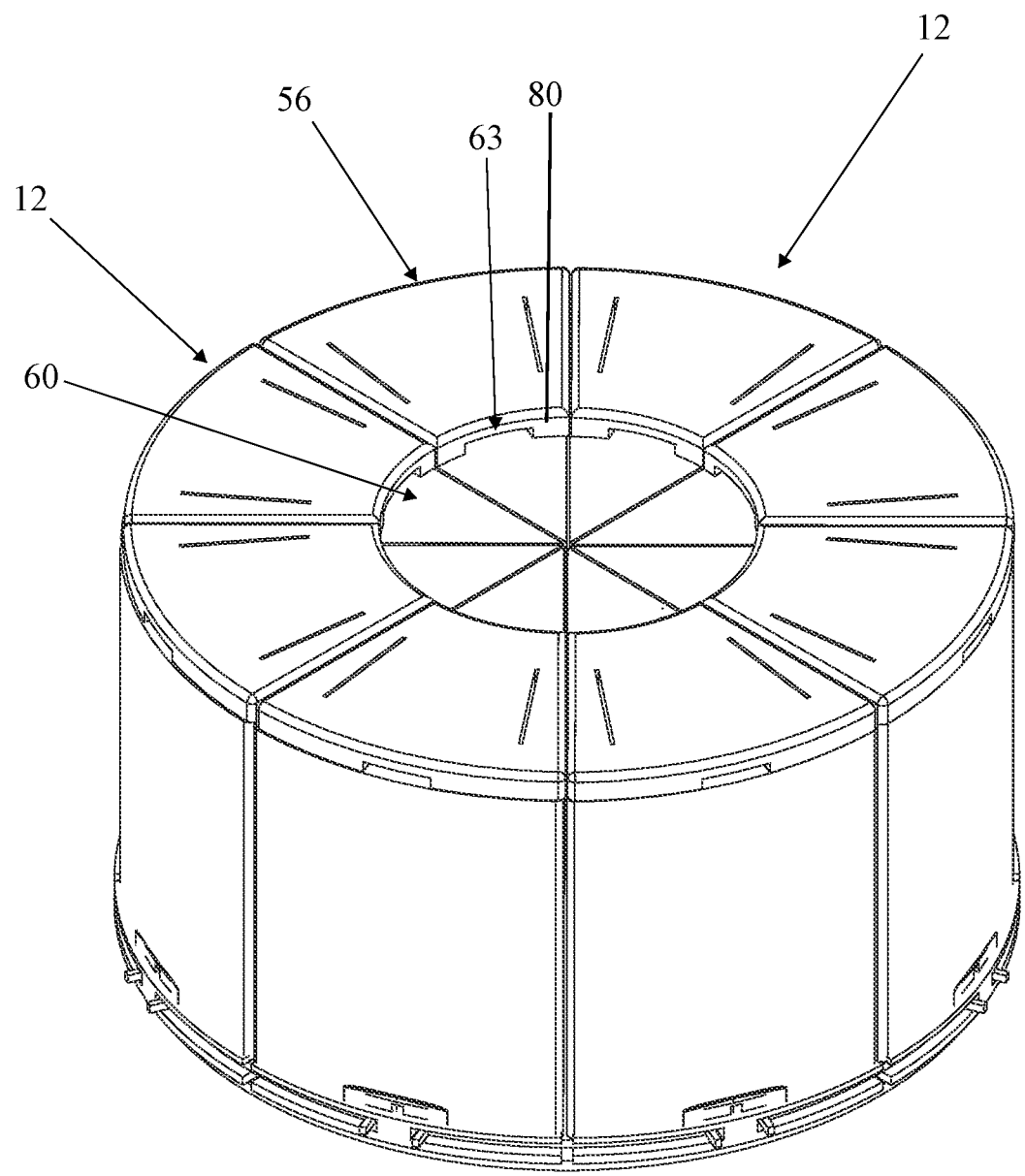
FIG. 21 is a side perspective view of the modular pastry packaging carousel shown without the removable handle carrier of the version shown in FIG. 1.
Figure 22:
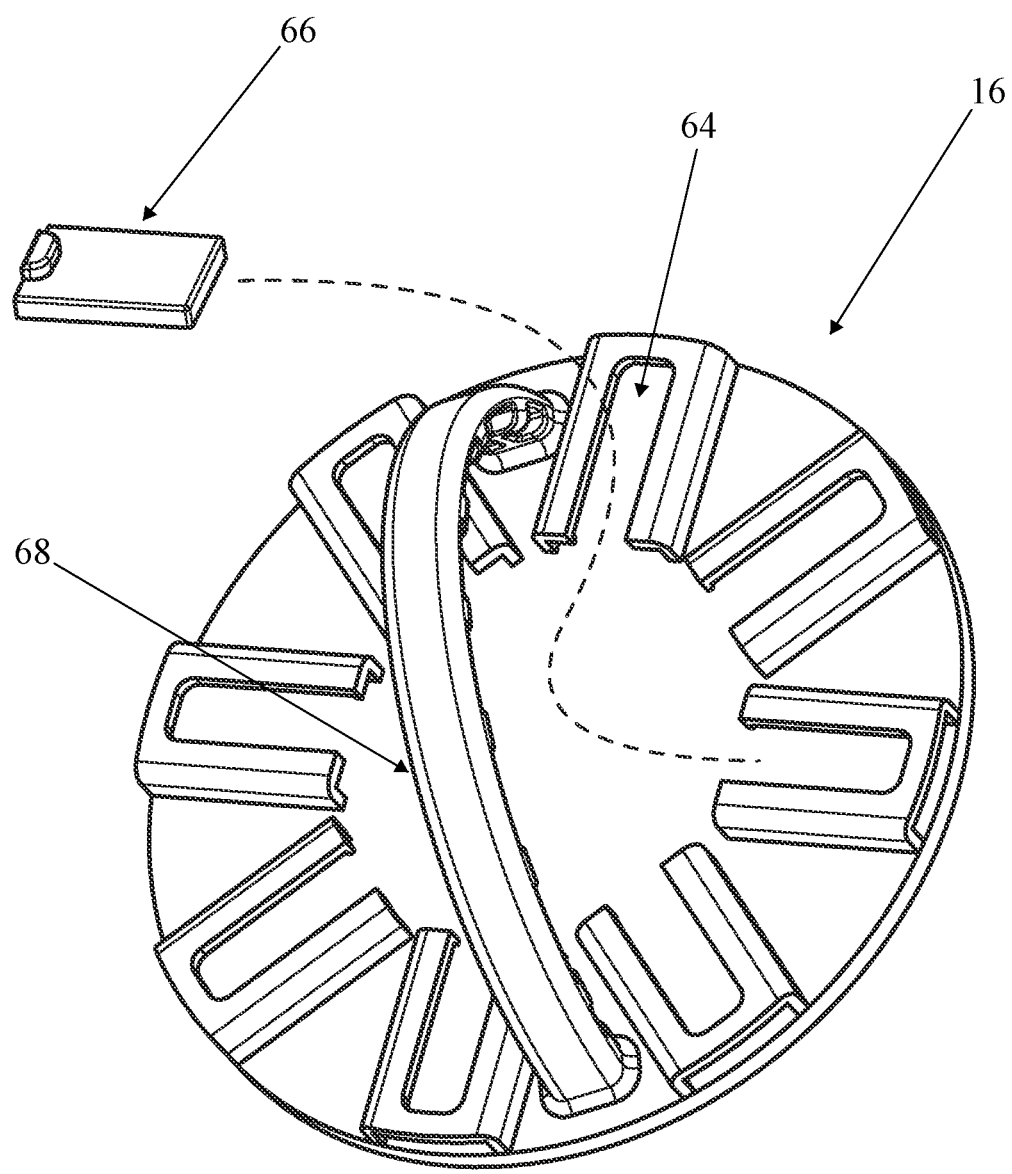
FIG. 22 is a top perspective view of the removable handle carrier showing the radial attachment switch removed.
Figure 23:
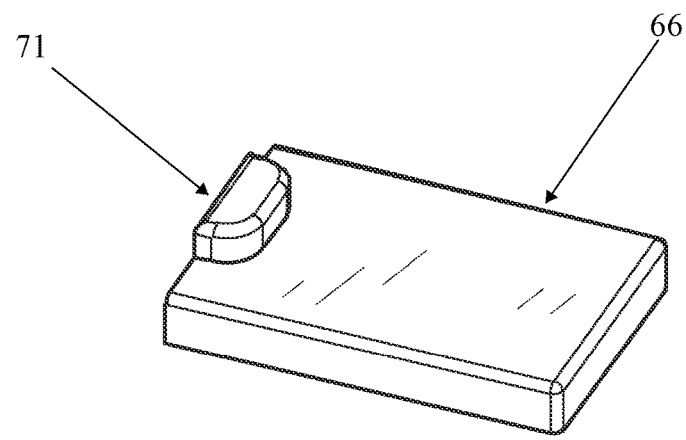
FIG. 23 is a top perspective view of the radial attachment switch of the version shown in FIG. 21.
Figure 24A:
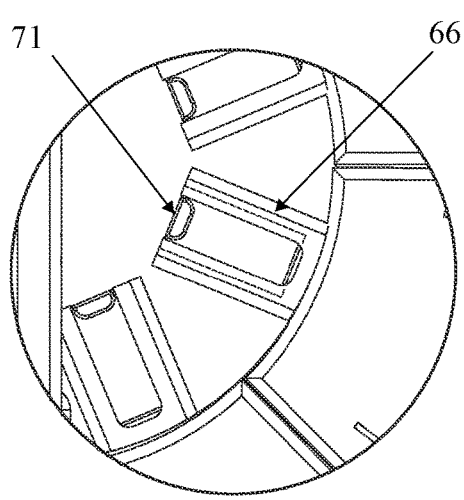
FIG. 24A is a top plan up-close view of the operation of the radial attachment switches shown while in the released position.
Figure 24B:
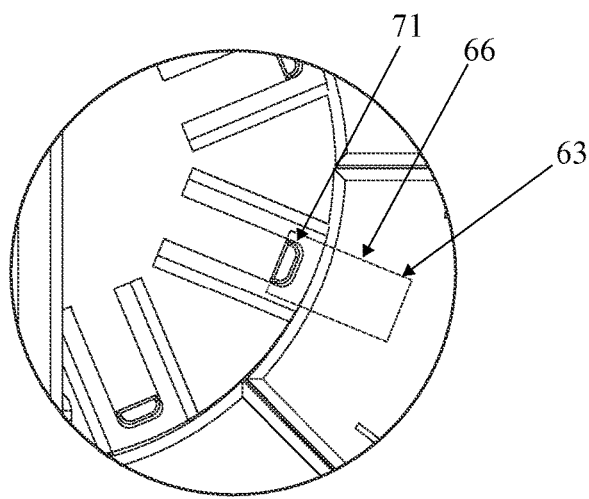
FIG. 24B is a top plan up-close view of the operation of the radial attachment switches shown while in the extended engaged position.
Figure 25:
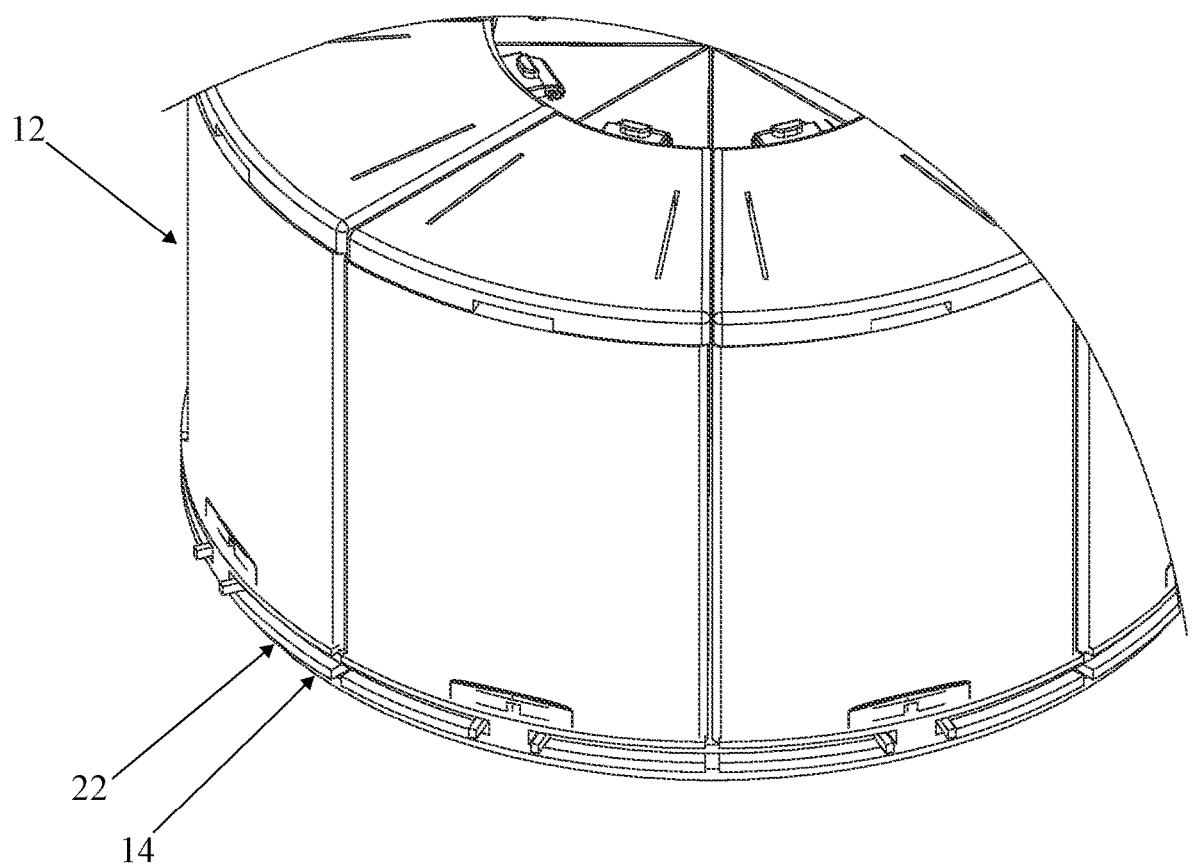
FIG. 25 is a partial side perspective view of the modular pastry packaging carousel of the version shown in FIG. 1.
Figure 33:
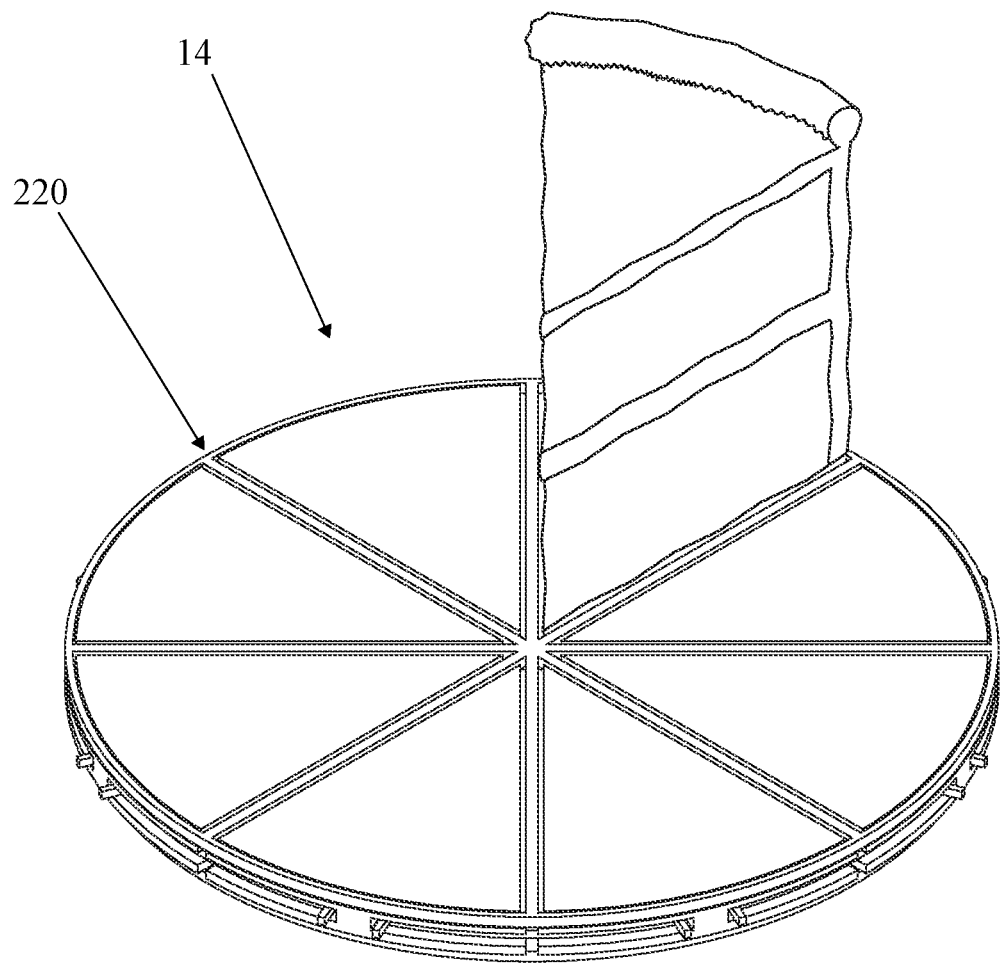
FIG. 33 is a top perspective view of the base tray with a slice of cake thereon.
Figure 34:
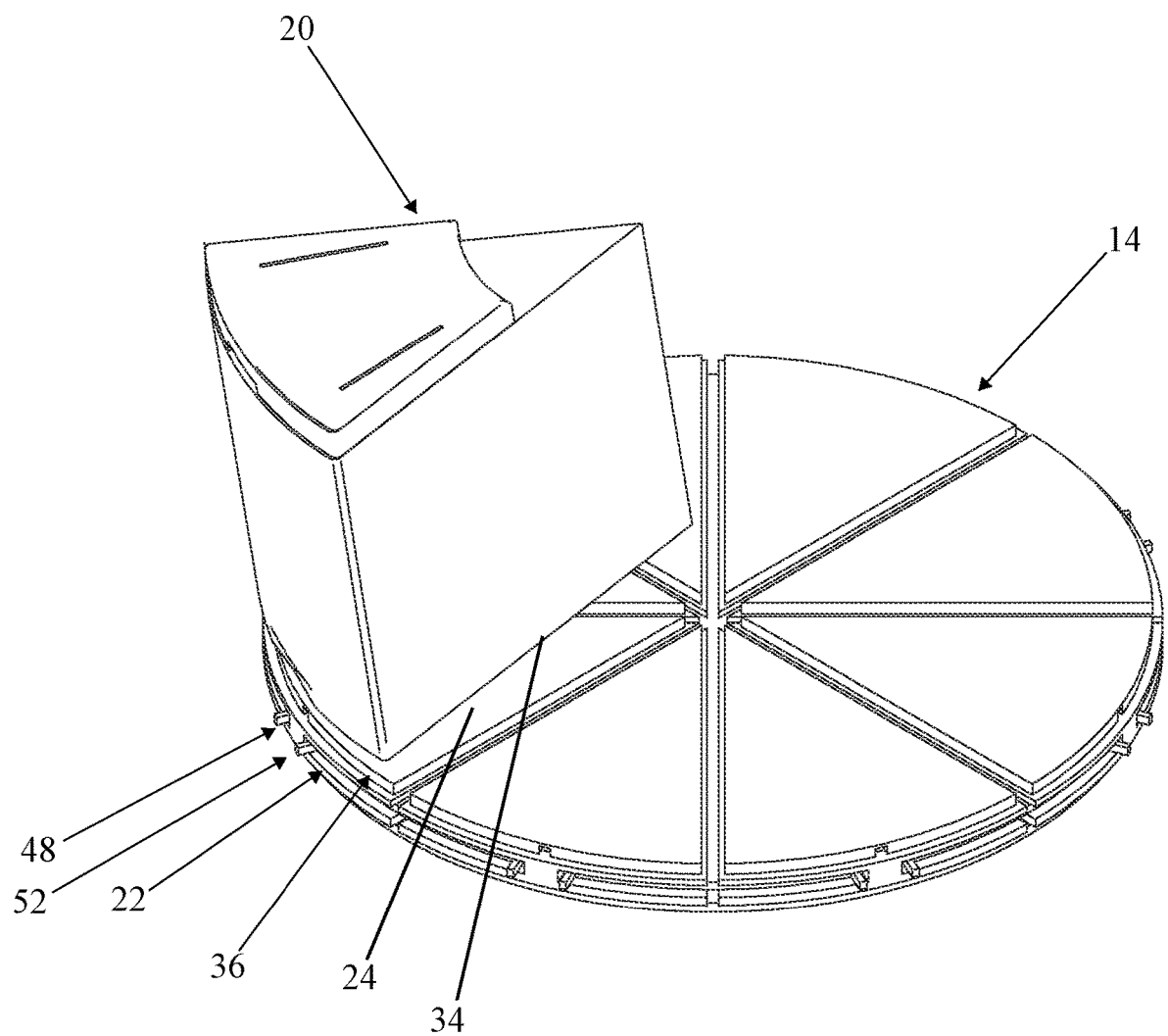
FIG. 34 is a base tray showing a cover portion being attached to a removable base of the pastry module.

Concerning FIG. 33 and FIG. 34, once the desired slices have been served, it is desirable that the remaining slices of the pastry be individually stored for purposes of consumption at a later time. With reference to FIG. 34, after removing the radial spacer 220, a cover portion 20 is selected and positioned over an individual slice of the pasty, connecting the bottom perimeter 34 of the cover portion 20 with the perimeter ledge 36 of the respective removable base 22. Thereafter, this process can be repeated until all remaining slices of the pastry are covered as desired as shown in FIG. 21. Further, spaces where slices had been removed and served may also be covered and will remain empty.

With reference to FIG. 4, once all cover portions 20 have been attached, for transport, the removable handle carrier 16 is positioned within the circular seat 60 formed by the collective pastry modules 12 and the attachment slot assembly 56. Thereafter, the respective radial attachment switches 66 are moved to the extended engaged position, thereby engaging each of the respective attachment slot assemblies 56 and radially extending internal slots 63. Thus, the modular pastry packaging carousel 10 can be transported by the fixed handle 68, for example, to a refrigerator. It is noted that each slice of pastry is individually sealed within each pastry module 12, thereby mitigating exposure to the surrounding environment, contaminants, and air.

Figure 26:
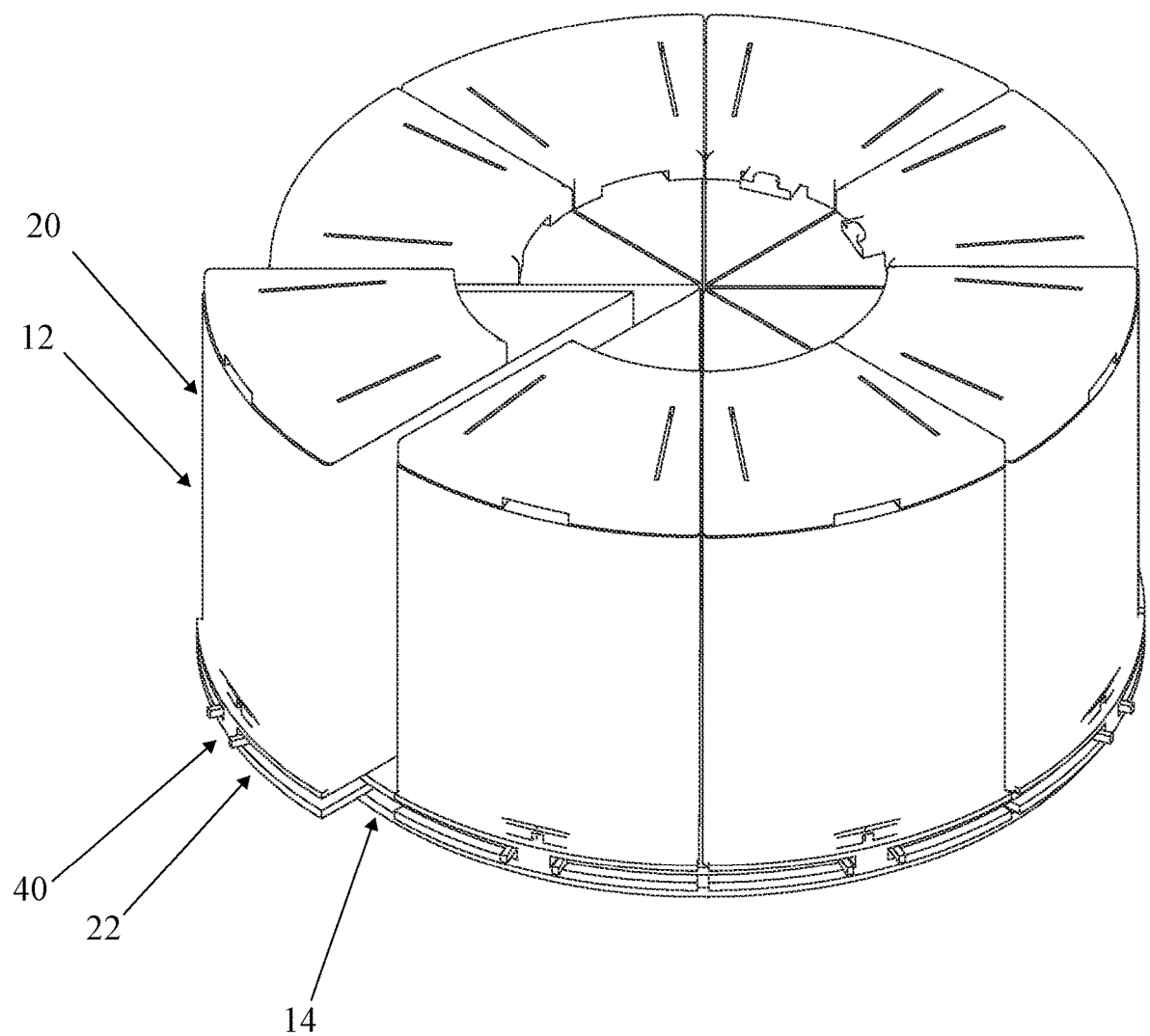
FIG. 26 is a side perspective view of the modular pastry packaging carousel of the version shown in FIG. 1.
Figure 27:
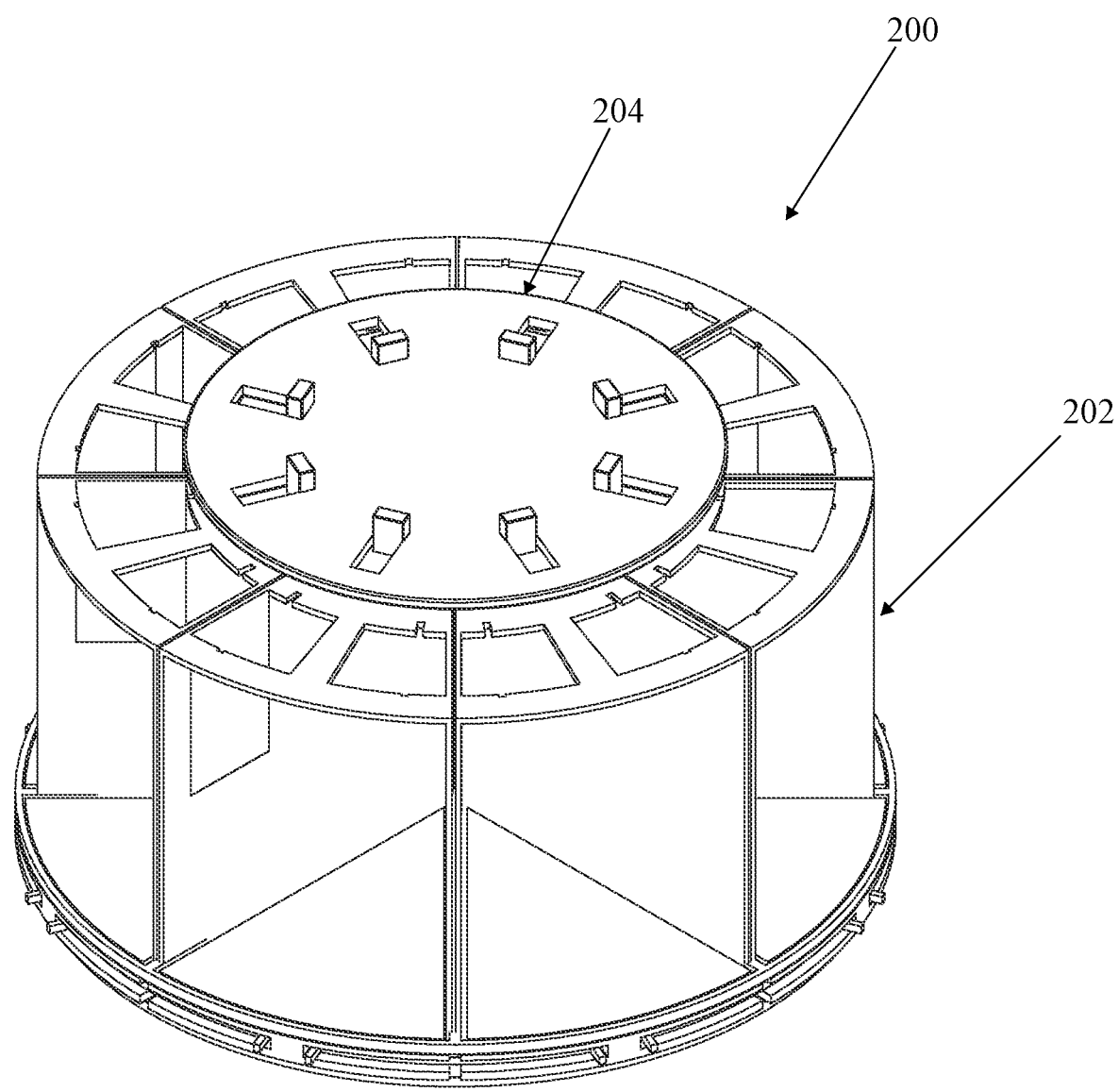
FIG. 27 is a top perspective view of the radial pastry slicer assembly placed on the base shown while in the retracted position.

Finally, as best shown in FIG. 11 and FIG. 26, if it is desirable to remove one or more of the pastry modules 12 from the base tray 14, for example, to serve a slice contained in a certain pastry module 12, then the selected pastry module 12 is removed by disengaging or squeezing the pair of squeeze tabs 52, thereby releasing the removable base 22 from the respective base tray 14 radial connection channels 38. In the version, the opposing tabs 52 are squeezed together to release the pastry module 12 from the base tray 14. Thus, the individual slice contained within the removed pastry module 12 can be either served or stored individually. If served, the cover portion 20 is removed from the removable base 22, thereby revealing the slice of pastry stored upon the top surface 24 of the removable base 22 to be removed or eaten directly therefrom.

The modular pastry packaging carousel 10 and radial pastry slicer assembly 200 can be made in any manner and of any material chosen with sound engineering judgment. Preferably, materials will be strong, lightweight, long-lasting, economic, and ergonomic.

The invention does not require that all the advantageous features and all the advantages need to be incorporated into every version of the invention.

Although preferred embodiments of the invention have been described in considerable detail, other versions and embodiments of the invention are certainly possible. Therefore, the present invention should not be limited to the described embodiments herein.

All features disclosed in this specification including any claims, abstract, and drawings may be replaced by alternative features serving the same, equivalent or similar purpose unless expressly stated otherwise.

What is claimed is:

1. A modular pastry packaging carousel comprising:
    a base tray assembly comprising:
        a bottom plate in the form of a disc having a top surface and a bottom surface;
        a top plate in the form of a disc positioned above the bottom plate; and
        a spacer positioned between and connecting the bottom plate and the top plate providing a radial gap therebetween;
        wherein the top plate provides a plurality of radial connection channels;
    a plurality of wedge-shaped pastry modules, each pastry module comprising:
        a cover portion having a first radial wall, a second radial wall, an arced-shaped rear wall, a bottom perimeter, and a sector-shaped top collectively forming a wedge-shaped enclosure having an open bottom;
        a sector-shaped removable base having
            a top surface;
            a perimeter ledge extending defining the top surface therebetween; and
            a means for selectively engaging the pastry module with the base tray radial connection channel; and
        an attachment slot assembly having a radially extending slot that is configured to receive the respective removable carrier radial attachment switch while in the extended engaged position; and
    an attachably removable handle carrier comprising:
        a radial plate having a plurality of radial channels formed by raised housings;
        a plurality of radial attachments switches slidable within each respective radial channel movable between a released position and an extended engaged position, each switch having an upward extending raised tab; and
        a fixed handle;
        wherein while in an attached configuration, each radial attachment switch is moved to the extended engaged position to interlock with each respective radially extending slot within the attachment slot assembly.

2. The modular pastry packaging carousel of claim 1, wherein the means for selectively engaging the pastry module with the base tray radial connection channel comprises the sector-based removable base further comprising a top sector-shaped plate and a bottom connection plate positioned in parallel and below the top sector-shaped plate, a radially extending spine connecting the top sector-shaped plate and the bottom connection plate defining a first and second wedge-shaped connection slots between the top-sector shaped plate and the bottom connection plate, wherein the spine is configured to engage lengthwise with the respective base tray radial connection channel and the top sector-shaped plate and the bottom connection plate are configured to sandwich the base tray top plate.

3. The modular pastry packaging carousel of claim 2, further comprising a pair of opposing squeeze tabs integrated along the spine configured to snap-fit with the opposing perimeters having embedded notches of the respective base tray radial connection channel.

\* \* \* \* \*